(12) United States Patent
Wang et al.

(10) Patent No.: US 11,186,954 B2
(45) Date of Patent: *Nov. 30, 2021

(54) FIBROUS STRUCTURES COMPRISING THREE OR MORE REGIONS

(71) Applicant: The Procter & Gamble Company, Cincinnati, OH (US)

(72) Inventors: Fei Wang, Mason, OH (US); Arman Ashraf, Mason, OH (US); Michael Donald Suer, Colerain Township, OH (US); John Daniel Algers, Montgomery, OH (US); Cunming Song, Symmes Township, OH (US); Hailing Bao, Blue Ash, OH (US); Antonius Lambertus DeBeer, Loveland, OH (US); David John Pung, Loveland, OH (US); Steven Lee Barnholtz, West Chester, OH (US); Paul Thomas Weisman, Cincinnati, OH (US); Alexander P. King, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,559

(22) Filed: Aug. 16, 2019

(65) Prior Publication Data

US 2019/0368131 A1    Dec. 5, 2019

Related U.S. Application Data

(63) Continuation of application No. 15/379,565, filed on Dec. 15, 2016, now Pat. No. 10,428,464.

(Continued)

(51) Int. Cl.
*D21H 27/00* (2006.01)
*A47L 13/16* (2006.01)
(Continued)

(52) U.S. Cl.
CPC ............ *D21H 27/005* (2013.01); *A47L 13/16* (2013.01); *B32B 5/10* (2013.01); *D03D 25/00* (2013.01);
(Continued)

(58) Field of Classification Search
CPC .. B06B 1/00; A47K 7/03; A47K 13/17; A47K 13/16; A47K 13/24; A47K 13/20;
(Continued)

(56) References Cited

U.S. PATENT DOCUMENTS 10,428,463 B2    10/2019    Wang et al.
10,428,464 B2 *  10/2019    Wang .................... D03D 25/00
(Continued)

FOREIGN PATENT DOCUMENTS

WO          2012051231 A2    4/2012
WO     WO 2015/150054 A1    10/2015
WO     WO 2016/078913 A1    5/2016

OTHER PUBLICATIONS

U.S. Appl. No. 15/379,577, filed Dec. 16, 2016, Hailing Bao, et al.
(Continued)

*Primary Examiner* — Camie S Thompson
(74) *Attorney, Agent, or Firm* — C. Brant Cook

(57) ABSTRACT

Fibrous structures containing filaments and solid additives, and more particularly to fibrous structures containing filaments and solid additives wherein the fibrous structure has three or more regions that exhibit different characteristics and/or properties and methods for making same, are provided.

20 Claims, 16 Drawing Sheets

Related U.S. Application Data

(60) Provisional application No. 62/267,453, filed on Dec. 15, 2015.

(51) Int. Cl.
| | | |
|---|---|---|
| *B32B 5/10* | (2006.01) | |
| *D03D 25/00* | (2006.01) | |
| *D04H 13/00* | (2006.01) | |
| *D21H 13/14* | (2006.01) | |
| *D21H 13/16* | (2006.01) | |
| *D21H 13/24* | (2006.01) | |

(52) U.S. Cl.
CPC ............. *D04H 13/00* (2013.01); *D21H 13/14* (2013.01); *D21H 13/16* (2013.01); *D21H 13/24* (2013.01); *D21H 27/002* (2013.01); *D21H 27/004* (2013.01); *B32B 2262/067* (2013.01); *B32B 2323/00* (2013.01); *B32B 2432/00* (2013.01)

(58) Field of Classification Search
CPC ...... A47K 13/256; A47K 10/16; A47K 10/02; B08B 1/006; B08B 17/006; D21H 27/002; D21H 27/02; D21H 27/38; D21H 27/008; D21H 27/005; D21H 27/004; D21H 27/30; D21H 21/20; D21H 21/22; D21H 21/50; D21H 11/00; D21H 11/04; C11D 17/049; B32B 2432/00; B32B 5/26; B32B 5/022; B32B 5/08; B32B 5/02; B32B 5/028; B32B 5/10; B32B 5/145; B32B 2262/0253; B32B 2262/14; B32B 2262/06; B32B 2262/02; B32B 7/114; B32B 7/045; B32B 2555/00; B32B 2307/54; B32B 2307/718; B32B 2307/726; B32B 29/02; B32B 29/002; D04H 1/593; D04H 1/4374; D04H 1/72; D04H 3/005; D04H 3/163; D04H 3/14; D04H 3/04; D04H 3/016; D04H 5/00; D06N 2211/24; D01F 1/10; D01F 6/04; D01F 6/46; D01F 8/06; A01N 25/34; A61K 18/028; A61K 2800/25; A61Q 19/10; A61Q 19/00; A61Q 17/005; D03D 25/00; Y10T 428/249924; Y10T 428/249921; Y10T 428/24994; Y10T 428/249925; Y10T 2/10; Y10T 2/659; A45D 2200/1027; A45D 44/00; A61F 2013/530394; A61F 13/51104; A61F 13/51106; A61F 13/5125

USPC ......... 428/152, 156, 195.1, 219, 292.1, 332; 162/157.2, 157.3, 157.4, 109; 510/146; 264/211; 15/209.1
See application file for complete search history.

(56) References Cited

U.S. PATENT DOCUMENTS

| | | |
|---|---|---|
| 10,478,865 B2 | 11/2019 | Wang et al. |
| 2003/0211802 A1 | 11/2003 | Keck et al. |
| 2005/0247416 A1 | 11/2005 | Forry et al. |
| 2006/0121814 A1 | 6/2006 | Vinson et al. |
| 2007/0228064 A1 | 10/2007 | Brennan et al. |
| 2010/0297378 A1 | 11/2010 | Mellin et al. |
| 2011/0039054 A1 | 2/2011 | Cabell et al. |
| 2011/0039469 A1 | 2/2011 | Cabell et al. |
| 2011/0104970 A1 | 5/2011 | Barnholtz et al. |
| 2012/0034430 A1 | 2/2012 | Nelson et al. |
| 2012/0090112 A1 | 4/2012 | Carrier et al. |
| 2013/0071624 A1 | 3/2013 | Manifold et al. |
| 2013/0167305 A1 | 7/2013 | Weisman et al. |
| 2013/0216789 A1 | 8/2013 | Kraus et al. |
| 2013/0302566 A1 | 11/2013 | Barnholtz et al. |
| 2014/0179586 A1 | 6/2014 | Letzelter et al. |
| 2014/0308486 A1 | 10/2014 | Butsch et al. |
| 2014/0308518 A1 | 10/2014 | Gordon et al. |
| 2014/0323381 A1 | 10/2014 | Hatzelt et al. |
| 2015/0086659 A1 | 3/2015 | Klofta et al. |
| 2019/0366389 A1 | 12/2019 | Wang et al. |
| 2019/0368130 A1 | 12/2019 | Wang et al. |

OTHER PUBLICATIONS

U.S. Appl. No. 15/379,534, filed Dec. 16, 2016, Hailing Bao, et al.
U.S. Appl. No. 15/379,661, filed Dec. 16, 2016, Fei Wang, et al.
PCT International Search Report dated Mar. 15, 2017—5 pages.
PCT International Search Report dated Mar. 10, 2017—5 pages.
PCT International Search Report dated Mar. 16, 2017—4 pages.
PCT International Search Report dated Jun. 27, 2017—5 pages.
PCT International Search Report dated Jul. 7, 2017—4 pages.
All Office Actions Application U.S. Appl. No. 15/379,538; U.S. Appl. No. 16/542,402; U.S. Appl. No. 15/379,542; U.S. Appl. No. 16/542,455 U.S. Appl. No. 15/379,565; U.S. Appl. No. 16/542,559; U.S. Appl. No. 15/379,577; U.S. Appl. No. 15/379,534; and U.S. Appl. No. 15/399,661.
Extended European Search Report and Search Opinion; Application No. 20163299.9 dated Apr. 29, 2020, 5 pages.

\* cited by examiner

FIBROUS STRUCTURES COMPRISING THREE OR MORE REGIONS

FIELD OF THE INVENTION

The present invention relates to fibrous structures comprising filaments and solid additives, and more particularly to fibrous structures comprising filaments and solid additives wherein the fibrous structure comprises three or more regions that exhibit different characteristics and/or properties and methods for making same.

BACKGROUND OF THE INVENTION

Fibrous structures, even textured and/or embossed fibrous structures, comprising a plurality of filaments and solid additives, for example fibers, are known in the art. However, such known fibrous structures contain two regions, not three or more regions, that exhibit different values for a common micro-CT intensive property as measured according to the Micro-CT Test Method. Nor do such known fibrous structures contain two regions that exhibit different values for a micro-CT basis weight as measured according to the Micro-CT Test Method and exhibit different values for light transmission as measured according to the Light Transmission Test Method.

Prior Art FIG. 1 shows an example of a known method 100 for making a known fibrous structure 10 comprising a plurality of filaments and solid additives, wherein the fibrous structure is imparted texture by an embossing operation. This known method 100 fails to create a fibrous structure 10 comprising three or more regions that exhibit different values for a common micro-CT intensive property as measured according to the Micro-CT Test Method. Further, such method 100 fails to produce a fibrous structure 10 that contains two regions that exhibit different values for a micro-CT basis weight as measured according to the Micro-CT Test Method and exhibit different values for light transmission as measured according to the Light Transmission Test Method. As shown in Prior Art FIG. 1, the method 100 comprises the step of mixing a plurality of filaments 12 with a plurality of solid additives 14. In one example, the solid additives 14 are wood pulp fibers, such as SSK fibers and/or Eucalyptus fibers, and the filaments 12 are polypropylene filaments. The solid additives 14 may be combined with the filaments 12, such as by being delivered to a stream of filaments 12 from a hammermill 66 via a solid additive spreader 67 to form a mixture of filaments 12 and solid additives 14. The filaments 12 may be created by meltblowing from a meltblow die 68. The mixture of solid additives 14 and filaments 12 are collected on a collection device, such as a belt 70 to form a fibrous structure 10. A forming vacuum 17 aids in the collection of the solid additives 14 and filaments 12 onto the collection device, by pulling air through the collection device. The resulting fibrous structure 10 is passed through an embossing roll nip 69 to yield a finished, textured fibrous structure 10.

Fibrous structures made by a method as described in Prior Art FIG. 1 have uniform basis weight distribution of a plurality of filaments and solid additives which therefore renders the fibrous structure restricted to deliver an overall performance level characteristic of the fibrous structure possessing such uniform, overall basis weight and composition of the plurality of filaments and solid additives. In other words, a fibrous structure exhibiting an uniform basis weight of a plurality of filaments and solid additives, results in the fibrous structure exhibiting the same performance and properties across the entire fibrous structure.

The performance of a fibrous structure as measured by its strength, burst, flexibility, absorbency, and/or visual aesthetics properties which may be a function of its microstructure as measured by intensive properties such as basis weight, thickness, density, bonding, composition, etc. The overall performance of a fibrous structure may be increased by creating regions within the structure where intensive properties including basis weight, thickness, density, bonding, composition, and combinations thereof, are transformed or made to be different so as to have a region delivering high levels of one performance attribute in one region and then high levels of another performance attribute in others. Having different regions with differing high levels of performance in one fibrous structure yields overall performance levels superior to a uniform fibrous structure. For example, the overall performance of the fibrous structure may be maximized by having regions within the fibrous structure which are responsible for delivering one performance requirement such as strength, while a separate region delivers a separate performance requirement such as absorbency or visual aesthetics, and yet another region delivers a performance requirement such as flexibility.

The delivery of overall fibrous structure performance within a region is directly related to the intensive properties imparted to the regions. The ability to spread the intensive property property features or values across three or more regions may provide overall higher fiber structure performance while minimizing negatives such as wetted fibrous structure transparency. For example, if basis weight within a region is reduced excessively, then this region in a wetted fibrous structure or wet wipe configuration, may be viewed as see though or too transparent by consumers. Such a negative may be minimized through a fibrous structure comprising three or more regions.

Therefore, a problem that has not been addressed by known fibrous structures comprising a plurality of filaments and a plurality of solid additives, such as fibers, is the creation of fibrous structures that comprise three or more regions that exhibit at least one common micro-CT intensive property that differs in value, and separately, fibrous structures comprising two regions that exhibit different values for a micro-CT basis weight as measured according to the Micro-CT Test Method and exhibit different values for light transmission as measured according to the Light Transmission Test Method and methods for making same.

In light of the foregoing, there is a need for a fibrous structure that comprises three or more regions that exhibit at least one common micro-CT intensive property that differs in value, and separately, fibrous structures comprising two regions that exhibit different values for a micro-CT basis weight as measured according to the Micro-CT Test Method and exhibit different values for light transmission as measured according to the Light Transmission Test Method that overcome the negatives of the known fibrous structures without such regions and methods for making such fibrous structures.

SUMMARY OF THE INVENTION

The present invention fulfills the needs described above by providing a fibrous structure comprising three or more regions that exhibit at least one common micro-CT intensive property that differs in value, and a fibrous structure comprising two regions that exhibit different values for a micro-CT basis weight as measured according to the Micro-CT Test Method and exhibit different values for light transmission as measured according to the Light Transmission Test Method and methods for making same.

One solution to the problem identified above is the creation of fibrous structures comprising a plurality of filaments and a plurality of solid additives having three or more regions that exhibit at least one common micro-CT intensive property that differs in value and/or having two regions that exhibit different values for a micro-CT basis weight as measured according to the Micro-CT Test Method and exhibit different values for light transmission as measured according to the Light Transmission Test Method.

In one example of the present invention, a fibrous structure comprising a plurality of filaments and a plurality of solid additives, the fibrous structure further comprising:
 a. a continuous network region, wherein the continuous network region comprises two or more regions, wherein at least two of the two or more regions within the continuous network region exhibit at least one common micro-CT intensive property that differs in value as measured according to the Micro-CT Test Method; and
 b. a plurality of discrete zones, is provided.

In another example of the present invention, a fibrous structure comprising a plurality of filaments and a plurality of solid additives, the fibrous structure further comprising:
 a. a first region;
 b. a second region; and
 c. a third region;
wherein each of the first, second, and third regions exhibit at least one common micro-CT intensive property that differs in value as measured according to the Micro-CT Test Method, is provided.

In yet another example of the present invention, a fibrous structure comprising a plurality of filaments and a plurality of solid additives, the fibrous structure further comprising:
 a. a first region; and
 b. a second region;
wherein the first and second regions exhibit a different micro-CT basis weight value as measured according to the Micro-CT Test Method, and wherein the first and second regions exhibit different light transmission values as measured according to the Light Transmission Test Method, is provided.

A method for making a fibrous structure, the method comprising the steps of:
 a. depositing a plurality of filaments and a plurality of solid additives onto a collection device such that a fibrous structure comprising a first region and a second region different from the first region are formed; and
 b. consolidating the fibrous structure to create three or more regions within the fibrous structure that exhibit different values for at least one common micro-CT intensive property as measured according to the Micro-CT Test Method, is provided.

The present invention provides a novel fibrous structure comprising a plurality of filaments and a plurality of solid additives and further comprising three or more regions and/or fibrous structures comprising two regions that exhibit different values for a micro-CT basis weight as measured according to the Micro-CT Test Method and exhibit different values for light transmission as measured according to the Light Transmission Test Method methods for making same.

DETAILED DESCRIPTION OF THE INVENTION

Figure 1:
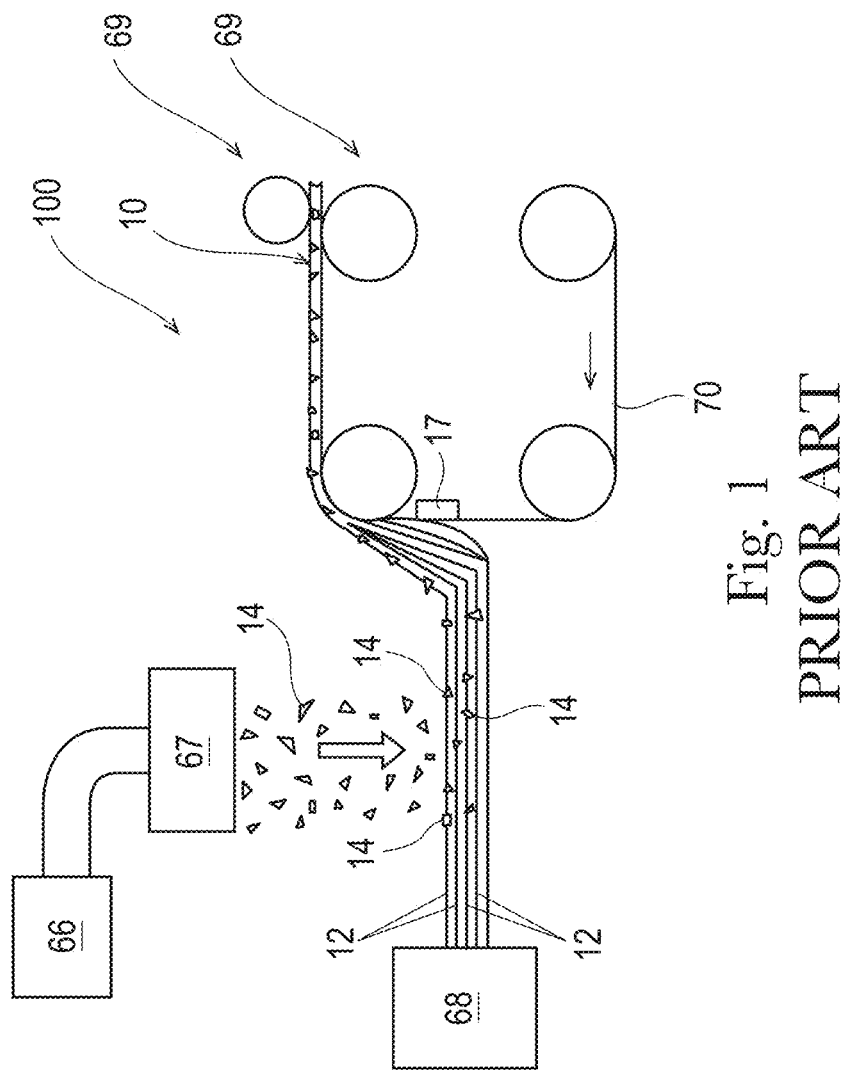
FIG. 1 is a schematic representation of a prior art method for making a prior art fibrous structure.

"Fibrous structure" as used herein means a structure that comprises a plurality of filaments and a plurality of solid additives, such as fibers, for example pulp fibers, for example wood pulp fibers, and/or particles, such as superabsorbent materials. In one example, a fibrous structure according to the present invention means an orderly arrangement of filaments and fibers within a structure in order to perform a function. In another example, a fibrous structure according to the present invention is a nonwoven.

Non-limiting examples of processes for making fibrous structures include meltblowing and/or spunbonding processes. In one example, the fibrous structures of the present invention are made via a process comprising meltblowing.

The fibrous structures of the present invention may be homogeneous or may be layered. If layered, the fibrous structures may comprise at least two and/or at least three and/or at least four and/or at least five layers.

The fibrous structures of the present invention may be co-formed fibrous structures.

"Co-formed fibrous structure" as used herein means that the fibrous structure comprises a mixture of at least two different materials wherein at least one of the materials comprises filaments, such as polypropylene filaments, and at least one other material, different from the first material, comprises solid additives, such as pulp fibers and/or particulates. In one example, a co-formed fibrous structure comprises solid additives, such as pulp fibers, such as wood pulp fibers, and filaments, such as polypropylene filaments that are commingled together.

"Solid additive" as used herein means a pulp fiber and/or a particulate.

"Particulate" as used herein means a granular substance or powder. In one example, the particulate comprises superabsorbent material particles.

"Filament" as used herein means an elongate particulate having an apparent length greatly exceeding its apparent width, i.e. a length to diameter ratio of at least about 10. A filament is made via spinning, for example via meltblowing and/or spunbonding, from a polymer, for example a thermoplastic polymer, such as polyolefin, for example polypropylene and/or polyethylene, and/or polyester. A filament" is an elongate particulate as described above that exhibits a length of greater than or equal to 5.08 cm (2 in.). Filaments are typically considered continuous or substantially continuous in nature. Non-limiting examples of filaments include meltblown and/or spunbond filaments. Non-limiting examples of materials that can be spun into filaments include thermoplastic polymer filaments, such as polyesters, nylons, polyolefins such as polypropylene filaments and polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

"Pulp fibers" as used herein means fibers that have been derived from vegetative sources, such as plants and/or trees. In one example of the present invention, "pulp fiber" refers to papermaking fibers. Papermaking fibers useful in the present invention include cellulosic pulp fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood pulp fibers can be blended, or alternatively, can be deposited in layers to provide a stratified web. U.S. Pat. Nos. 4,300,981 and 3,994,771 are incorporated herein by reference for the purpose of disclosing layering of hardwood and softwood pulp fibers. Also applicable to the present invention are pulp fibers derived from recycled paper, which may contain any or all of the above categories as well as other non-fibrous materials such as fillers and adhesives used to facilitate the original papermaking.

In addition to the various wood pulp fibers, other pulp fibers such as cotton linters, trichomes, seed hairs, rice straw, wheat straw, bamboo, and bagasse can be used in this invention.

"Distinct from" and/or different from" as used herein means two things that exhibit different properties and/or levels of materials, for example different by 0.5 and/or 1 and/or 2 and/or 3 and/or 5 and/or 10 units and/or different by 1% and/or 3% and/or 5% and/or 10% and/or 20%, different materials, and/or different average fiber diameters.

"Textured pattern" as used herein means a pattern, for example a surface pattern, such as a three-dimensional (3D) surface pattern present on a surface of the fibrous structure and/or on a surface of a component making up the fibrous structure.

"Fibrous Structure Basis Weight" as used herein is the weight per unit area of a sample reported in lbs/3000 ft$^2$ or g/m$^2$ and is measured according to the Fibrous Structure Basis Weight Test Method described herein.

"Ply" as used herein means an individual, integral fibrous structure.

"Plies" as used herein means two or more individual, integral fibrous structures disposed in a substantially contiguous, face-to-face relationship with one another, forming a multi-ply sanitary tissue product. It is also contemplated that an individual, integral fibrous structure can effectively form a multi-ply sanitary tissue product, for example, by being folded on itself.

"Machine Direction" or "MD" as used herein means the direction parallel to the flow of the fibrous structure through the fibrous structure making machine and/or manufacturing equipment.

"Cross Machine Direction" or "CD" as used herein means the direction parallel to the width of the fibrous structure through the fibrous structure making machine and/or manufacturing equipment and perpendicular to the machine direction.

"Micro-geometry" and permutations thereof refers to relatively small (i.e., "microscopical") details of a fibrous structure, such as, for example, surface texture, without regard to the structure's overall configuration, as opposed to its overall (i.e., "macroscopical") geometry. Terms containing "macroscopical" or "macroscopically" refer to an overall geometry of a structure, or a portion thereof, under consideration when it is placed in a two-dimensional configuration, such as the X-Y plane. For example, on a macroscopical level, the fibrous structure, when it is disposed on a flat surface, comprises a relatively thin and flat sheet. On a microscopical level, however, the structure can comprise a plurality of first regions that form a first plane having a first elevation or first region, and a plurality of domes or "pillows" dispersed throughout and outwardly extending from the framework region to form a second elevation or second region.

"Common Intensive Property" as used herein means an intensive property possessed by more than one region within a fibrous structure. Such intensive properties of the fibrous structure include, without limitation, density, basis weight, thickness, and combinations thereof. For example, if density is a common intensive property of two or more different regions, a value of the density in one region can differ from a value of the density in one or more other regions. Regions (such as, for example, a first region and a second region and/or a continuous network region and at least one of a plurality of discrete zones) are identifiable areas visually discernible and/or visually distinguishable from one another by distinct intensive properties.

"Micro-CT Intensive Properties" are intensive properties that are measured according to the Micro-CT Test Method. Non-limiting examples of such micro-CT intensive properties include micro-CT basis weight, micro-CT thickness, and/or micro-CT density.

"X," "Y," and "Z" designate a conventional system of Cartesian coordinates, wherein mutually perpendicular coordinates "X" and "Y" define a reference X-Y plane, and "Z" defines an orthogonal to the X-Y plane. "Z-direction" designates any direction perpendicular to the X-Y plane. Analogously, the term "Z-dimension" means a dimension, distance, or parameter measured parallel to the Z-direction. When an element, such as, for example, a molding member curves or otherwise deplanes, the X-Y plane follows the configuration of the element.

"Substantially continuous" or "continuous" region refers to an area within which one can connect any two points by an uninterrupted line running entirely within that area throughout the line's length. That is, the substantially continuous region has a substantial "continuity" in all directions parallel to the first plane and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Substantially semi-continuous" or "semi-continuous" region refers an area which has "continuity" in all, but at least one, directions parallel to the first plane, and in which area one cannot connect any two points by an uninterrupted line running entirely within that area throughout the line's length. The semi-continuous framework may have continuity only in one direction parallel to the first plane. By analogy with the continuous region, described above, while an absolute continuity in all, but at least one, directions is preferred, minor deviations from such a continuity may be tolerable as long as those deviations do not appreciably affect the performance of the fibrous structure.

"Discontinuous" or "discrete" regions or zones refer to discrete, and separated from one another areas or zones that are discontinuous in all directions parallel to the first plane.

"Molding member" is a structural element that can be used as a support for the mixture of filaments and solid additives that can be deposited thereon during a process of making a fibrous structure, and as a forming unit to form (or "mold") a desired microscopical geometry of a fibrous structure. The molding member may comprise any element that has the ability to impart a three-dimensional pattern to the fibrous structure being produced thereon, and includes, without limitation, a stationary plate, a belt, a cylinder/roll, a woven fabric, and a band.

"Meltblowing" is a process for producing filaments directly from polymers or resins using high-velocity air or another appropriate force to attenuate the filaments before collecting the filaments on a collection device, such as a belt, for example a patterned belt or molding member. In a meltblowing process the attenuation force is applied in the form of high speed air as the material (polymer) exits a die or spinnerette.

"Spunbonding" is a process for producing filaments directly from polymers by allowing the polymer to exit a die or spinnerette and drop a predetermined distance under the forces of flow and gravity and then applying a force via high velocity air or another appropriate source to draw and/or attenuate the polymer into a filament.

"Stack" as used herein, refers to a neat pile of fibrous structures and/or wipes. Based upon the assumption that there are at least three wipes in a stack, each wipe, except for the topmost and bottommost wipes in the stack, will be directly in face to face contact with the wipe directly above and below itself in the stack. Moreover, when viewed from above, the wipes will be layered on top of each other, or superimposed, such that only the topmost wipe of the stack will be visible. The height of the stack is measured from the bottom of the bottommost wipe in the stack to the top of the topmost wipe in the stack and is provided in units of millimeters (mm).

"Liquid composition" and "lotion" are used interchangeably herein and refer to any liquid, including, but not limited to a pure liquid such as water, an aqueous solution, a colloid, an emulsion, a suspension, a solution and mixtures thereof. The term "aqueous solution" as used herein, refers to a solution that is at least about 20% and/or at least about 40% and/or at least about 50% water by weight, and is no more than 99.9% and/or no more than about 99% and/or no more than about 98% and/or no more than about 97% and/or no more than about 95% and/or no more than about 90% water by weight.

In one example, the liquid composition comprises water or another liquid solvent. Generally the liquid composition is of sufficiently low viscosity to impregnate the entire structure of the fibrous structure. In another example, the liquid composition may be primarily present at the fibrous structure surface and to a lesser extent in the inner structure of the fibrous structure. In a further example, the liquid composition is releasably carried by the fibrous structure, that is the liquid composition is carried on or in the fibrous structure and is readily releasable from the fibrous structure by applying some force to the fibrous structure, for example by wiping a surface with the fibrous structure.

The liquid compositions used in the present invention are primarily although not limited to, oil in water emulsions. In one example, the liquid composition of the present invention comprises at least 80% and/or at least 85% and/or at least 90% and/or at least 95% by weight water.

When present on or in the fibrous structure, the liquid composition may be present at a level of from about 10% to about 1000% of the basis weight of the fibrous structure and/or from about 100% to about 700% of the basis weight of the fibrous structure and/or from about 200% to about 500% and/or from about 200% to about 400% of the basis weight of the fibrous structure.

The liquid composition may comprise an acid. Non-limiting examples of acids that can be used in the liquid composition of the present invention are adipic acid, tartaric acid, citric acid, maleic acid, malic acid, succinic acid, glycolic acid, glutaric acid, malonic acid, salicylic acid, gluconic acid, polymeric acids, phosphoric acid, carbonic acid, fumaric acid and phthalic acid and mixtures thereof. Suitable polymeric acids can include homopolymers, copolymers and terpolymers, and may contain at least 30 mole % carboxylic acid groups. Specific examples of suitable polymeric acids useful herein include straight-chain poly (acrylic) acid and its copolymers, both ionic and nonionic, (e.g., maleic-acrylic, sulfonic-acrylic, and styrene-acrylic copolymers), those cross-linked polyacrylic acids having a molecular weight of less than about 250,000, preferably less than about 100,000 poly (α-hydroxy) acids, poly (meth-acrylic) acid, and naturally occurring polymeric acids such as carageenic acid, carboxy methyl cellulose, and alginic acid. In one example, the liquid composition comprises citric acid and/or citric acid derivatives.

The liquid composition may also contain salts of the acid or acids used to lower the pH, or another weak base to impart buffering properties to the fibrous structure. The buffering response is due to the equilibrium which is set up between the free acid and its salt. This allows the fibrous structure to maintain its overall pH despite encountering a relatively high amount of bodily waste as would be found post urination or defecation in a baby or adult. In one embodiment the acid salt would be sodium citrate. The amount of sodium citrate present in the lotion would be between 0.01 and 2.0%, alternatively 0.1 and 1.25%, or alternatively 0.2 and 0.7% of the lotion.

In one example, the liquid composition does not contain any preservative compounds. In another example, the liquid composition does contain preservative compounds.

In addition to the above ingredients, the liquid composition may comprise addition ingredients. Non-limiting examples of additional ingredients that may be present in the liquid composition of the present invention include: skin conditioning agents (emollients, humectants) including, waxes such as petrolatum, cholesterol and cholesterol derivatives, di and tri-glycerides including sunflower oil and sesame oil, silicone oils such as dimethicone copolyol, caprylyl glycol and acetoglycerides such as lanolin and its derivatives, emulsifiers; stabilizers; surfactants including anionic, amphoteric, cationic and non ionic surfactants, colourants, chelating agents including EDTA, sun screen agents, solubilizing agents, perfumes, opacifying agents, vitamins, viscosity modifiers; such as xanthan gum, astringents and external analgesics.

"Pre-moistened" and "wet" are used interchangeably herein and refer to fibrous structures and/or wipes which are moistened with a liquid composition prior to packaging in a generally moisture impervious container or wrapper. Such pre-moistened wipes, which can also be referred to as "wet wipes" and "towelettes", may be suitable for use in cleaning babies, as well as older children and adults.

"Saturation loading" and "lotion loading" are used interchangeably herein and refer to the amount of liquid composition applied to the fibrous structure or wipe. In general, the amount of liquid composition applied may be chosen in order to provide maximum benefits to the end product comprised by the wipe. Saturation loading is typically expressed as grams of liquid composition per gram of dry wipe.

Saturation loading, often expressed as percent saturation, is defined as the percentage of the dry fibrous structure or wipe's mass (void of any liquid composition) that a liquid composition present on/in the fibrous structure or wipe represents. For example, a saturation loading of 1.0 (equivalently, 100% saturation) indicates that the mass of liquid composition present on/in the fibrous structure or wipe is equal to the mass of dry fibrous structure or wipe (void of any liquid composition).

The following equation is used to calculate saturation load of a fibrous structure or wipe:

$$\text{Saturation Loading} = \left[\frac{\text{wet wipe mass}}{(\text{wipe size}) * (\text{basis weight})}\right] - 1$$

"Saturation gradient index" (SGI) is a measure of how well the wipes at the top of a stack retain moisture. The SGI of a stack of wipes is measured as described infra and is calculated as the ratio of the average lotion load of the bottommost wipes in the stack versus the topmost wipes in the stack. The ideal stack of wipes will have an SGI of about 1.0; that is, the topmost wipes will be equally as moist as the bottommost wipes. In the aforementioned embodiments, the stacks have a SGI from about 1.0 to about 1.5.

The saturation gradient index for a fibrous structure or wipe stack is calculated as the ratio of the saturation loading of a set number of fibrous structures or wipes from the bottom of a stack to that of the same number of fibrous structures or wipes from the top of the stack. For example, for an approximately 80 count wipe stack, the saturation gradient index is this ratio using 10 wipes from bottom and top; for an approximately 30 count wipe stack, 5 wipes from bottom and top are used; and for less than 30, only the top and bottom single wipes are used in the saturation gradient index calculation. The following equation illustrates the example of an 80 count stack saturation gradient index calculation:

$$\text{Saturation Gradient Index} = \frac{\text{average lotion load of bottom 10 wipes in stack}}{\text{average lotion load of top 10 wipes in stack}}$$

A saturation profile, or wetness gradient, exists in the stack when the saturation gradient index is greater than 1.0. In cases where the saturation gradient index is significantly greater than 1.0, e.g. over about 1.5, lotion is draining from the top of the stack and settling in the bottom of the container, such that there may be a noticeable difference in the wetness of the topmost fibrous structures or wipes in the stack compared to that of the fibrous structures or wipes nearest the bottom of the stack. For example, a perfect tub of wipes would have a saturation gradient index of 1.0; the bottommost wipes and topmost wipes would maintain equivalent saturation loading during storage. Additional liquid composition would not be needed to supersaturate the wipes in an effort to keep all of the wipes moist, which typically results in the bottommost wipes being soggy.

"Percent moisture" or "% moisture" or "moisture level" as used herein means 100×(the ratio of the mass of water contained in a fibrous structure to the mass of the fibrous structure). The product of the above equation is reported as a %.

"Surface tension" as used herein, refers to the force at the interface between a liquid composition and air. Surface tension is typically expressed in dynes per centimeter (dynes/cm).

"Surfactant" as used herein, refers to materials which preferably orient toward an interface. Surfactants include the various surfactants known in the art, including: nonionic surfactants; anionic surfactants; cationic surfactants; amphoteric surfactants, zwitterionic surfactants; and mixtures thereof.

"Visually Discernible" as used herein, refers to being capable of being seen by the naked eye when viewed at a distance of 12 inches (in), or 30.48 centimeters (cm), under the unimpeded light of an ordinary incandescent 60 watt light bulb that is inserted in a fixture such as a table lamp. It follows that "visually discernible" as used herein refers to those features of fibrous structures, whether or not they are pre-moistened, that are readily visually discernible when the wipe is subjected to normal use, such as the cleaning of a child's skin. If one or more regions within a fibrous structure are not readily visually discernible, then a micro-CT image of the fibrous structure, as described in the Micro-CT Test Method described herein, may be used to help identify regions within the fibrous structure.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structures

The fibrous structures of the present invention comprise a plurality of filaments and a plurality of solid additives. The filaments and the solid additives may be commingled together. In one example, the fibrous structure is a coform fibrous structure comprising filaments and solid additives. The filaments may be present in the fibrous structures of the present invention at a level of less than 90% and/or less than 80% and/or less than 65% and/or less than 50% and/or greater than 5% and/or greater than 10% and/or greater than 20% and/or from about 10% to about 50% and/or from about 25% to about 45% by weight of the fibrous structure on a dry basis.

The solid additives may be present in the fibrous structures of the present invention at a level of greater than 10% and/or greater than 25% and/or greater than 50% and/or less than 100% and/or less than 95% and/or less than 90% and/or less than 85% and/or from about 30% to about 95% and/or from about 50% to about 85% by weight of the fibrous structure on a dry basis.

The filaments and solid additives may be present in the fibrous structures of the present invention at a weight ratio of filaments to solid additive of greater than 10:90 and/or greater than 20:80 and/or less than 90:10 and/or less than 80:20 and/or from about 25:75 to about 50:50 and/or from about 30:70 to about 45:55. In one example, the filaments and solid additives are present in the fibrous structures of the present invention at a weight ratio of filaments to solid additives of greater than 0 but less than 1.

In one example, the fibrous structures of the present invention exhibit a basis weight of from about 10 gsm to about 1000 gsm and/or from about 10 gsm to about 500 gsm and/or from about 15 gsm to about 400 gsm and/or from about 15 gsm to about 300 gsm as measured according to the Fibrous Structure Basis Weight Test Method described herein. In another example, the fibrous structures of the present invention exhibit a basis weight of from about 10 gsm to about 200 gsm and/or from about 20 gsm to about 150 gsm and/or from about 25 gsm to about 125 gsm and/or from about 30 gsm to about 100 gsm and/or from about 30 gsm to about 80 gsm as measured according to the Fibrous Structure Basis Weight Test Method described herein. In still another example, the fibrous structures of the present invention exhibit a basis weight of from about 80 gsm to about 1000 gsm and/or from about 125 gsm to about 800 gsm and/or from about 150 gsm to about 500 gsm and/or from about 150 gsm to about 300 gsm as measured according to the Fibrous Structure Basis Weight Test Method described herein.

In one example, the fibrous structure of the present invention comprises a core component. A "core component" as used herein means a fibrous structure comprising a plurality of filaments and optionally a plurality of solid additives. In one example, the core component is a coform fibrous structure comprising a plurality of filaments and a plurality of solid additives, for example pulp fibers. In one example, the core component is the component that exhibits the greatest basis weight with the fibrous structure of the present invention. In one example, the total core components present in the fibrous structures of the present invention exhibit a basis weight that is greater than 50% and/or greater than 55% and/or greater than 60% and/or greater than 65% and/or greater than 70% and/or less than 100% and/or less than 95% and/or less than 90% of the total basis weight of the fibrous structure of the present invention as measured according to the Fibrous Structure Basis Weight Test Method described herein. In another example, the core component exhibits a basis weight of greater than 12 gsm and/or greater than 14 gsm and/or greater than 16 gsm and/or greater than 18 gsm and/or greater than 20 gsm and/or greater than 25 gsm as measured according to the Fibrous Structure Basis Weight Test Method described herein.

"Consolidated region" as used herein means a region within a fibrous structure where the filaments and optionally the solid additives have been compressed, compacted, and/or packed together with pressure and optionally heat (greater than 150° F.) to strengthen the region compared to the same region in its unconsolidated state or a separate region which did not see the compression or compacting pressure. In one example, a region is consolidated by forming unconsolidated regions within a fibrous structure on a patterned molding member and passing the unconsolidated regions within the fibrous structure while on the patterned molding member through a pressure nip, such as a heated metal anvil roll (about 275° F.) and a rubber anvil roll with pressure to compress the unconsolidated regions into one or more consolidated regions. In another example, a region is consolidated by forming unconsolidated regions within a fibrous structure on a patterned molding member and passing the unconsolidated regions within the fibrous structure while on the patterned molding member through a pressure nip, such as a heated textured metal anvil roll (about 275° F.) and a rubber anvil roll with pressure to compress at least portions of the unconsolidated regions into one or more consolidated regions. In one example, the filaments present in the consolidated region, for example on the side of the fibrous structure that is contacted by the heated roll comprises fused filaments that create a skin on the surface of the fibrous structure, which may be visible via SEM images.

In one example, the consolidated regions correspond to raised and/or resin containing areas of a patterned molding member 24 as shown in FIGS. 10A, 10B, and 10C, which are non-limiting examples of patterned molding members 24. In one example, the consolidated region exhibits a micro-CT thickness and micro-CT basis weight that is less than the micro-CT thickness and micro-CT basis weight of the unconsolidated region from which the region is originally derived as measured according to the Micro-CT Test Method.

The fibrous structure of the present invention may, in addition a core component, further comprise a scrim component. "Scrim component" as used herein means a fibrous structure comprising a plurality of filaments. In one example, the total scrim components present in the fibrous structures of the present invention exhibit a basis weight that is less than 25% and/or less than 20% and/or less than 15% and/or less than 10% and/or less than 7% and/or less than 5% and/or greater than 0% and/or greater than 1% of the total basis weight of the fibrous structure of the present invention as measured according to the Fibrous Structure Basis Weight Test Method described herein. In another example, the scrim component exhibits a basis weight of 10 gsm or less and/or less than 10 gsm and/or less than 8 gsm and/or less than 6 gsm and/or greater than 5 gsm and/or less than 4 gsm and/or greater than 0 gsm and/or greater than 1 gsm as measured according to the Fibrous Structure Basis Weight Test Method described herein.

A scrubby component may also be include in the fibrous structure of the present invention. "Scrubby component" as used herein means that part of the fibrous structure of the present invention that imparts the scrubby quality to the fibrous structure. The scrubby component is distinct and different from the core and scrim components even though the scrubby component may be present in and/or on the core and scrim components. The scrubby component may be a feature, such as a pattern, for example a surface pattern, or texture that causes the fibrous structure to exhibit a scrubby property during use by a consumer. In another example, the scrubby component may be a material, for example a coarse filament (exhibits a greater average diameter than the majority of filaments within the core and/or scrim components). In one example, the scrubby component is a fibrous structure comprising a plurality of filaments. In one example, the total scrubby components present in the fibrous structures of the present invention exhibit a basis weight that is less than 25% and/or less than 20% and/or less than 15% and/or less than 10% and/or less than 7% and/or less than 5% and/or greater than 0% and/or greater than 1% of the total basis weight of the fibrous structure of the present invention as measured according to the Fibrous Structure Basis Weight Test Method described herein. In another example, the scrubby component exhibits a basis weight of 10 gsm or less and/or less than 10 gsm and/or less than 8 gsm and/or less than 6 gsm and/or greater than 5 gsm and/or less than 4 gsm and/or greater than 0 gsm and/or greater than 1 gsm as measured according to the Fibrous Structure Basis Weight Test Method described herein.

In one example, at least one of the core components of the fibrous structure comprises a plurality of solid additives, for example pulp fibers, such as comprise wood pulp fibers and/or non-wood pulp fibers.

In one example, at least one of the core components of the fibrous structure comprises a plurality of core filaments. In another example, at least one of the core components comprises a plurality of solid additives and a plurality of the core filaments. In one example, the solid additives and the core filaments are present in a layered orientation within the core component. In one example, the core filaments are present as a layer between two solid additive layers. In another example, the solid additives and the core filaments are present in a coform layer. At least one of the core filaments comprises a polymer, for example a thermoplastic polymer, such as a polyolefin. The polyolefin may be selected from the group consisting of: polypropylene, polyethylene, and mixtures thereof. In another example, the thermoplastic polymer of the core filament may comprise a polyester.

In one example, at least one of the core components comprises one or more scrubby components, for example a scrubby element, such as a scrubby filament. In one example, the scrubby filaments comprise a polymer, for example a thermoplastic polymer and/or hydroxyl polymer as described above with reference to the core components.

In one example, the scrubby filaments exhibit an average fiber diameter of less than 3 mm and/or less than 2 mm and/or less than 1 mm and/or less than 750 µm and/or less than 500 µm and/or less than 250 µm and/or greater than 50 µm and/or greater than 75 µm and/or greater than 100 µm as measured according to the Diameter Test Method described herein.

In one example, at least one of the scrim components is adjacent to at least one of the core components within the fibrous structure. In another example, at least one of the core components is positioned between two scrim components within the fibrous structure.

In one example, at least one of the scrim components of the fibrous structure of the present invention comprises a plurality of scrim filaments, for example scrim filaments, wherein the scrim filaments comprise a polymer, for example a thermoplastic and/or hydroxyl polymer as described above with reference to the core components.

In one example, at least one of the scrim filaments exhibits an average fiber diameter of less than 50 and/or less than 25 and/or less than 10 and/or at least 1 and/or greater than 1 and/or greater than 3 µm as measured according to the Diameter Test Method described herein.

In one example, at least one of the scrim components of the fibrous structures of the present invention comprises one or more scrubby components, for example a scrubby element, such as a scrubby filament. In one example, the scrubby filaments comprise a polymer, for example a thermoplastic polymer and/or hydroxyl polymer as described above with reference to the core components.

In one example, the scrubby filaments exhibit an average fiber diameter of less than 250 and/or less than 200 and/or less than 150 and/or less than 120 and/or less than 100 and/or 75 and/or less than 50 and/or less than 40 and/or less than 30 and/or less than 25 and/or greater than 0.6 and/or greater than 1 and/or greater than 3 and/or greater than 5 and/or greater than 10 µm as measured according to the Diameter Test Method described herein.

In another example, the scrubby element of the scrim component may comprise a pattern, for example a surface pattern, such as a textured pattern, present on a surface of the scrim component. The pattern may comprise a non-random, repeating pattern. The pattern may comprise a patterned molding member-imparted pattern.

The average fiber diameter of the core filaments is less than 250 and/or less than 200 and/or less than 150 and/or less than 100 and/or less than 50 and/or less than 30 and/or less than 25 and/or less than 10 and/or greater than 1 and/or greater than 3 µm as measured according to the Diameter Test Method described herein.

In one example, the fibrous structures of the present invention may comprise any suitable amount of filaments and any suitable amount of solid additives. For example, the fibrous structures may comprise from about 10% to about 70% and/or from about 20% to about 60% and/or from about 30% to about 50% by dry weight of the fibrous structure of filaments and from about 90% to about 30% and/or from about 80% to about 40% and/or from about 70% to about 50% by dry weight of the fibrous structure of solid additives, such as wood pulp fibers.

In one example, the filaments and solid additives of the present invention may be present in fibrous structures according to the present invention at weight ratios of filaments to solid additives of from at least about 1:1 and/or at least about 1:1.5 and/or at least about 1:2 and/or at least about 1:2.5 and/or at least about 1:3 and/or at least about 1:4 and/or at least about 1:5 and/or at least about 1:7 and/or at least about 1:10.

In one example, the solid additives, for example wood pulp fibers, may be selected from the group consisting of softwood kraft pulp fibers, hardwood pulp fibers, and mixtures thereof. Non-limiting examples of hardwood pulp fibers include fibers derived from a fiber source selected from the group consisting of: Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of softwood pulp fibers include fibers derived from a fiber source selected from the group consisting of: Pine, Spruce, Fir, Tamarack, Hemlock, Cypress, and Cedar. In one example, the hardwood pulp fibers comprise tropical hardwood pulp fibers. Non-limiting examples of suitable tropical hardwood pulp fibers include Eucalyptus pulp fibers, Acacia pulp fibers, and mixtures thereof.

In one example, the wood pulp fibers comprise softwood pulp fibers derived from the kraft process and originating from southern climates, such as Southern Softwood Kraft (SSK) pulp fibers. In another example, the wood pulp fibers comprise softwood pulp fibers derived from the kraft process and originating from northern climates, such as Northern Softwood Kraft (NSK) pulp fibers.

The wood pulp fibers present in the fibrous structure may be present at a weight ratio of softwood pulp fibers to hardwood pulp fibers of from 100:0 and/or from 90:10 and/or from 86:14 and/or from 80:20 and/or from 75:25 and/or from 70:30 and/or from 60:40 and/or about 50:50 and/or to 0:100 and/or to 10:90 and/or to 14:86 and/or to 20:80 and/or to 25:75 and/or to 30:70 and/or to 40:60. In one example, the weight ratio of softwood pulp fibers to hardwood pulp fibers is from 86:14 to 70:30.

In one example, the fibrous structures of the present invention comprise one or more trichomes. Non-limiting examples of suitable sources for obtaining trichomes, especially trichome fibers, are plants in the Labiatae (*Lamiaceae*) family commonly referred to as the mint family Examples of suitable species in the Labiatae family include *Stachys byzantina*, also known as *Stachys lanata* commonly referred to as lamb's ear, woolly betony, or woundwort. The term *Stachys byzantina* as used herein also includes cultivars *Stachys byzantina* 'Primrose Heron', *Stachys byzantina* 'Helene von Stein' (sometimes referred to as *Stachys byzantina* 'Big Ears'), *Stachys byzantina* 'Cotton Boll', *Stachys byzantina* 'Variegated' (sometimes referred to as *Stachys byzantina* 'Striped Phantom'), and *Stachys byzantina* 'Silver Carpet'.

In another example, the fibrous structure of the present invention, alone or as a ply of fibrous structure in a multi-ply fibrous structure, comprises a creped fibrous structure. The creped fibrous structure may comprise a fabric creped fibrous structure, a belt creped fibrous structure, and/or a cylinder creped, such as a cylindrical dryer creped fibrous structure. In one example, the fibrous structure may comprise undulations and/or a surface comprising undulations.

In yet another example, the fibrous structure of the present invention, alone or as a ply of fibrous structure in a multi-ply fibrous structure, comprises an uncreped fibrous structure.

In still another example, the fibrous structure of the present invention, alone or as a ply of fibrous structure in a multi-ply fibrous structure, comprises a foreshortened fibrous structure.

In another example of a fibrous structure in accordance with the present invention, instead of being layers of fibrous structure, the material forming layers may be in the form of plies wherein two or more of the plies may be combined to form a multi-ply fibrous structure. The plies may be bonded together, such as by thermal bonding and/or adhesive bonding, to form the multi-ply fibrous structure. After a bonding operation, especially a thermal bonding operation, it may be difficult to distinguish the plies of the fibrous structure and the fibrous structure may visually and/or physically be a similar to a layered fibrous structure in that one would have difficulty separating the once individual plies from each other.

The fibrous structures of the present invention and/or any sanitary tissue products comprising such fibrous structures may be subjected to any post-processing operations such as embossing operations, printing operations, tuft-generating operations, thermal bonding operations, ultrasonic bonding operations, perforating operations, surface treatment operations such as application of lotions, silicones and/or other materials and mixtures thereof.

Non-limiting examples of suitable polypropylenes for making the filaments of the present invention are commercially available from Lyondell-Basell and Exxon-Mobil.

Any hydrophobic or non-hydrophilic materials within the fibrous structure, such as polypropylene filaments, may be surface treated and/or melt treated with a hydrophilic modifier. Non-limiting examples of surface treating hydrophilic modifiers include surfactants, such as Triton X-100. Non-limiting examples of melt treating hydrophilic modifiers that are added to the melt, such as the polypropylene melt, prior to spinning filaments, include hydrophilic modifying melt additives such as VW351 and/or S-1416 commercially available from Polyvel, Inc. and Irgasurf commercially available from Ciba. The hydrophilic modifier may be associated with the hydrophobic or non-hydrophilic material at any suitable level known in the art. In one example, the hydrophilic modifier is associated with the hydrophobic or non-hydrophilic material at a level of less than about 20% and/or less than about 15% and/or less than about 10% and/or less than about 5% and/or less than about 3% to about 0% by dry weight of the hydrophobic or non-hydrophilic material.

The fibrous structures of the present invention may include optional additives, each, when present, at individual levels of from about 0% and/or from about 0.01% and/or from about 0.1% and/or from about 1% and/or from about 2% to about 95% and/or to about 80% and/or to about 50% and/or to about 30% and/or to about 20% by dry weight of the fibrous structure. Non-limiting examples of optional additives include permanent wet strength agents, temporary wet strength agents, dry strength agents such as carboxymethylcellulose and/or starch, softening agents, lint reducing agents, opacity increasing agents, wetting agents, odor absorbing agents, perfumes, temperature indicating agents, color agents, dyes, osmotic materials, microbial growth detection agents, antibacterial agents, liquid compositions, surfactants, and mixtures thereof.

The fibrous structure of the present invention may itself be a sanitary tissue product. It may be convolutedly wound about a core to form a roll. It may be combined with one or more other fibrous structures as a ply to form a multi-ply sanitary tissue product. In one example, a co-formed fibrous structure of the present invention may be convolutedly wound about a core to form a roll of co-formed sanitary tissue product. The rolls of sanitary tissue products may also be coreless.

Three or More Regions

The fibrous structures of the present invention comprise a plurality of filaments and a plurality of solid additives, such as fibers, wherein the fibrous structure comprises three or more regions that exhibit at least one common micro-CT intensive property that differs in value as measured according to the Micro-CT Test Method described herein. In one example, the three or more regions are adjacent to each other, for example, a first region of the fibrous structure is adjacent to a second region, the first region is also adjacent to a third region, and also the second region is adjacent to the third region. In another example, the first region may be adjacent to the second region, but not adjacent to the third region, but the second region may also be adjacent to the third region. In even another example, the first region may be adjacent to the third region, but not adjacent to the second region, but the third region may also be adjacent to the second region. In still another example, the two or more and/or three or more of the regions may not be adjacent to one another.

Figure 2A:
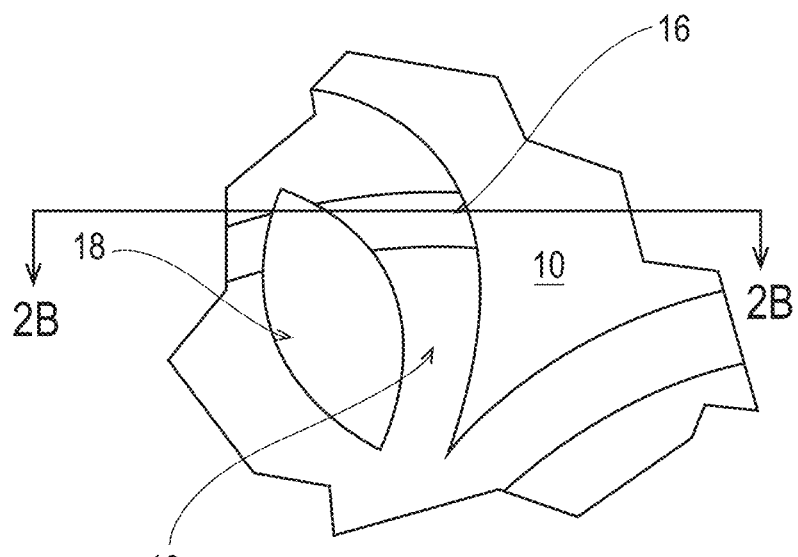
FIG. 2A is a partial top view of a fibrous structure according to the present invention.
Figure 2B:
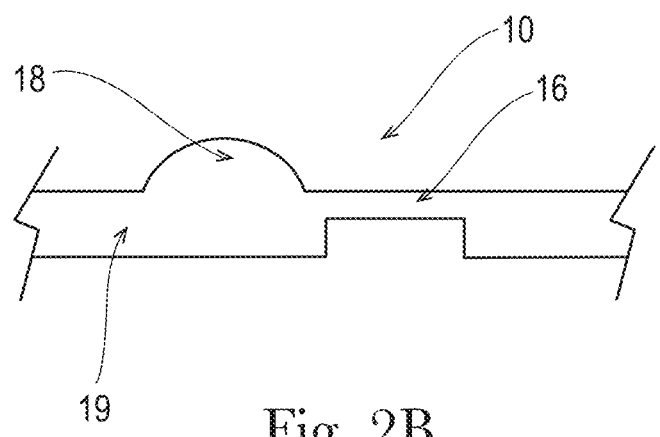
FIG. 2B is a cross-sectional view of FIG. 2A taken along line 2B-2B.

As shown in FIGS. 2A and 2B, an example of a fibrous structure 10 of the present invention comprising a plurality of filaments and a plurality of solid additives, such as fibers, for example pulp fibers, comprises a first region 16, a second region 18, and a third region 19. The first region 16 and third region 19 may each form a part of a continuous or substantially continuous network region. The continuous or substantially continuous network region may be formed in the fibrous structure 10 upon collection of the filaments with or without the solid additives on a collection device having a continuous or substantially continuous knuckle pattern and discrete pillow pattern as described herein. The second region 18 may be in the form of a discrete zone within the continuous or substantially continuous network region. The discrete zone (pillow in this case) may be formed in the fibrous structure 10 upon collection of the filaments with or without the solid additives on a collection device having a continuous or substantially continuous knuckle pattern and discrete pillow pattern as described herein. The continuous or substantially continuous network region may be a macroscopically, monoplanar, patterned, continuous or substantially continuous network region.

In one example, the first, second, and third regions 16, 18, 19 of the fibrous structure 10 of the present invention may have at least one common micro-CT intensive property, such as, for example, micro-CT basis weight, micro-CT thickness, and/or micro-CT density. One or more of the common micro-CT intensive properties; for example micro-CT basis weight, micro-CT thickness, and/or micro-CT density, of the first, second, and third regions 16, 18, 19 may differ in value as measured according to the Micro-CT Test Method described herein.

Figure 3A:
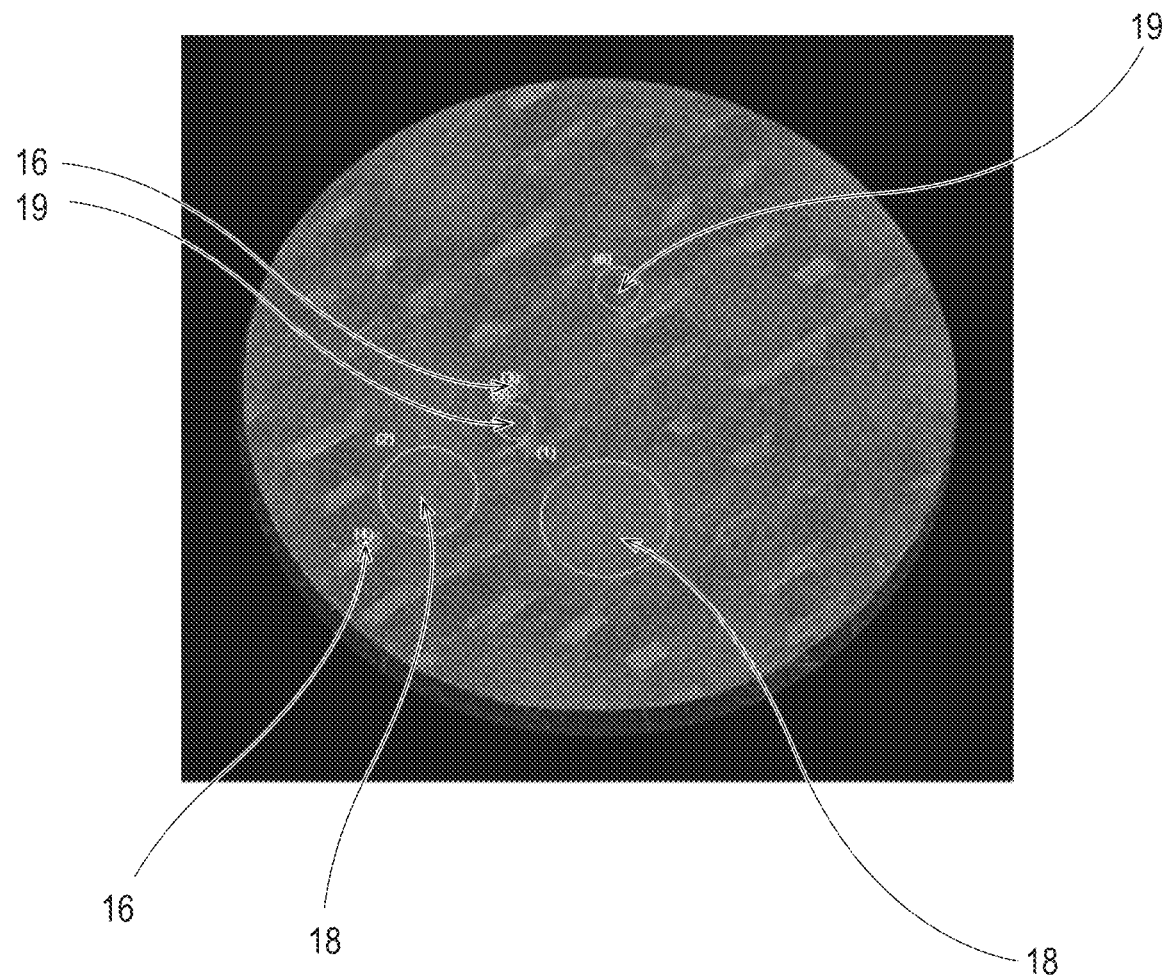
FIG. 3A is a micro-CT image of an example of a fibrous structure according to the present invention.
Figure 3B:
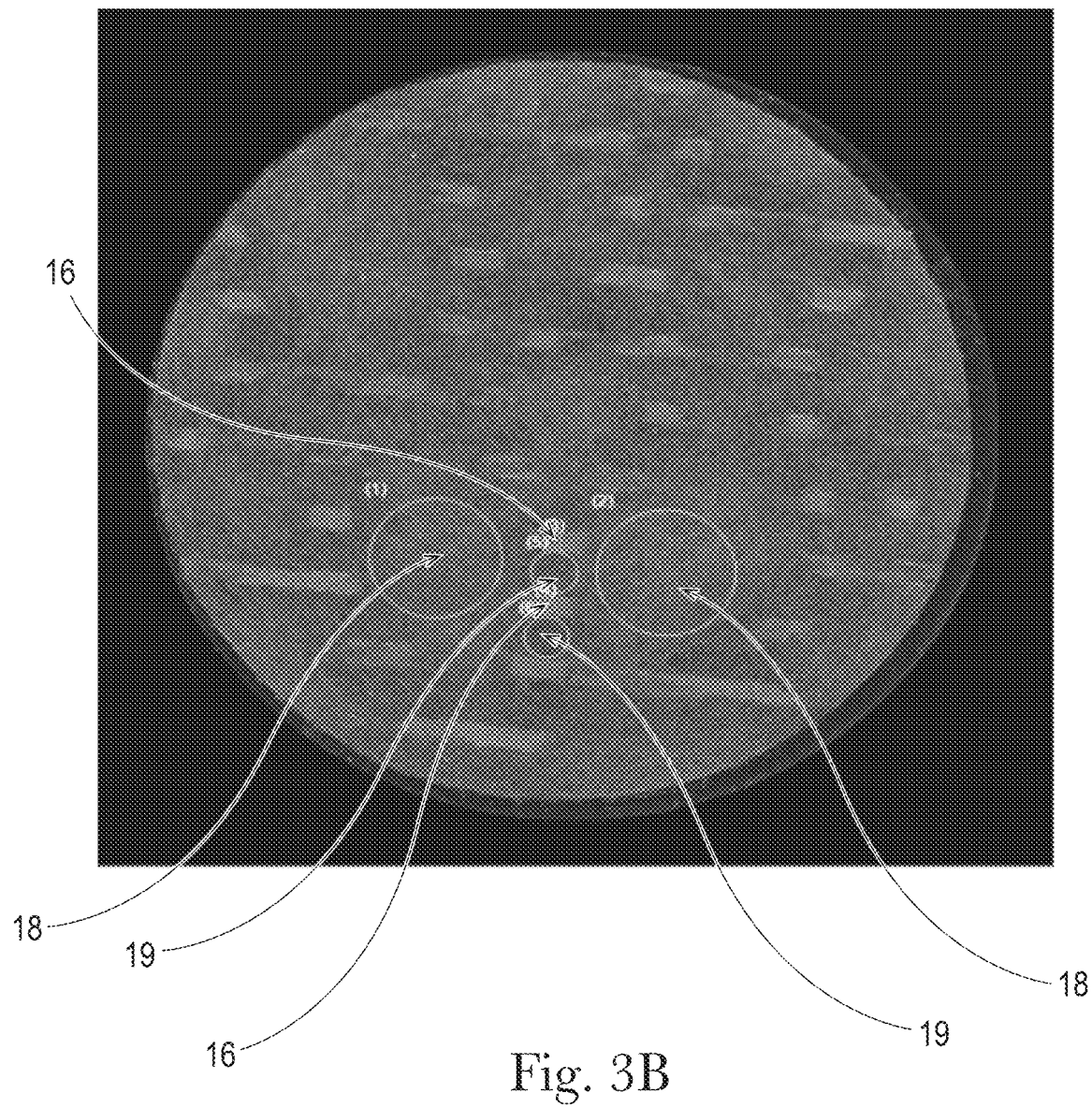
FIG. 3B is a micro-CT image of another example of a fibrous structure according to the present invention.

As shown in FIGS. 3A and 3B and Table 1 below, for example, the micro-CT density value of the first region 16 may be greater than the micro-CT density value of the second region 18 and the micro-CT density value of the third region 19 as measured according to the Micro-CT Test Method described herein. In this case, the first region 16 with the greater micro-CT density value is referred to as a "knuckle" and the third region 19 with the intermediate micro-CT density value is also referred to as a "knuckle". The first and third regions 16, 19 combine to form a "continuous knuckle" or "substantially continuous knuckle". The second region 18 with the least micro-CT density value is referred to as a "pillow", such as a "discrete pillow".

Alternatively, in another example (not shown), the continuous network region or substantially continuous network region may exhibit the lowest micro-CT density value and be in the form of a "continuous network region" or "substantially continuous network region" referred to as a "continuous pillow" or "substantially continuous pillow" and the discrete zone or discrete zones comprise two or more regions that exhibit different micro-CT density values and are greater than the continuous or substantially continuous pillow and are referred to as a "discrete knuckle" with two or more knuckle regions therein or as "discrete knuckles" as measured according to the Micro-CT Test Method described herein.

The absolute difference in micro-CT density values between any two or more and/or any three or more of the regions, for example the first region 16, second region 18, and third region 19 may be greater than 0.0005 g/cm$^3$ and/or greater than 0.01 g/cm$^3$ and/or greater than 0.25 g/cm$^3$ and/or greater than 0.4 g/cm$^3$ and/or greater than 0.5 g/cm$^3$ and/or greater than 0.75 g/cm$^3$ and/or greater than 0.9 g/cm$^3$ as measured according to the Micro-CT Test Method described herein.

In one example, the ratio of the micro-CT density values between any two of the regions, for example the micro-CT density value of the first region 16 to the micro-CT density value of the second region 18, may be less than 1 and/or less than 0.9 and/or less than 0.8 as measured according to the Micro-CT Test Method described herein.

In another example, the ratio of the micro-CT density values between any two of the regions, for example the micro-CT density value of the first region 16 to the micro-CT density value of the second region 18, may be greater than 1 and/or greater than 2 and/or greater than 5 as measured according to the Micro-CT Test Method described herein.

The first region 16 may exhibit a micro-CT density value of greater than 0.01 g/cm$^3$ and/or greater than 0.02 g/cm$^3$ and/or from about 0.01 g/cm$^3$ to about 1 g/cm$^3$ and/or from about 0.02 g/cm$^3$ to about 0.9 g/cm$^3$ and/or from about 0.04 g/cm$^3$ to about 0.8 g/cm$^3$ and/or from about 0.05 g/cm$^3$ to about 0.7 g/cm$^3$ as measured according to the Micro-CT Test Method described herein. In one example, the first region 16 exhibits a micro-CT density value of from about 0.02 g/cm$^3$ to about 0.4 g/cm$^3$ and/or from about 0.06 g/cm$^3$ to about 0.2 g/cm$^3$ and/or from about 0.07 g/cm$^3$ to about 0.12 g/cm$^3$ as measured according to the Micro-CT Test Method described herein. In another example, the first region 16 exhibits a micro-CT density value of from about 0.4 g/cm$^3$ to about 1 g/cm$^3$ and/or from about 0.5 g/cm$^3$ to about 0.9 g/cm$^3$ and/or from about 0.6 g/cm$^3$ to about 0.8 g/cm$^3$ as measured according to the Micro-CT Test Method described herein.

The second region 18 may exhibit a micro-CT density value of greater than 0.01 g/cm$^3$ and/or greater than 0.02 g/cm$^3$ and/or from about 0.01 g/cm$^3$ to about 1 g/cm$^3$ and/or from about 0.02 g/cm$^3$ to about 0.9 g/cm$^3$ and/or from about 0.04 g/cm$^3$ to about 0.8 g/cm$^3$ and/or from about 0.05 g/cm$^3$ to about 0.7 g/cm$^3$ as measured according to the Micro-CT Test Method described herein. In one example, the second region 18 exhibits a micro-CT density value of from about 0.02 g/cm$^3$ to about 0.4 g/cm$^3$ and/or from about 0.06 g/cm$^3$ to about 0.2 g/cm$^3$ and/or from about 0.07 g/cm$^3$ to about 0.12 g/cm$^3$ as measured according to the Micro-CT Test Method described herein. In another example, the first region 16 exhibits a micro-CT density value of from about 0.4 g/cm$^3$ to about 1 g/cm$^3$ and/or from about 0.5 g/cm$^3$ to about 0.9 g/cm$^3$ and/or from about 0.6 g/cm$^3$ to about 0.8 g/cm$^3$ as measured according to the Micro-CT Test Method described herein.

The third region 19 may exhibit a micro-CT density value of greater than 0.01 g/cm$^3$ and/or greater than 0.02 g/cm$^3$ and/or from about 0.01 g/cm$^3$ to about 1 g/cm$^3$ and/or from about 0.02 g/cm$^3$ to about 0.9 g/cm$^3$ and/or from about 0.04 g/cm$^3$ to about 0.8 g/cm$^3$ and/or from about 0.05 g/cm$^3$ to about 0.7 g/cm$^3$ as measured according to the Micro-CT Test Method described herein. In one example, the second region 18 exhibits a micro-CT density value of from about 0.02 g/cm$^3$ to about 0.4 g/cm$^3$ and/or from about 0.06 g/cm$^3$ to about 0.2 g/cm$^3$ and/or from about 0.07 g/cm$^3$ to about 0.12 g/cm$^3$ as measured according to the Micro-CT Test Method described herein. In another example, the first region 16 exhibits a micro-CT density value of from about 0.4 g/cm$^3$ to about 1 g/cm$^3$ and/or from about 0.5 g/cm$^3$ to about 0.9 g/cm$^3$ and/or from about 0.6 g/cm$^3$ to about 0.8 g/cm$^3$ as measured according to the Micro-CT Test Method described herein.

As shown in FIGS. 3A and 3B and Table 1 below, for example, the micro-CT basis weight value of the second region 18 may be greater than the micro-CT basis weight value of the first region 16 and the third region 19 as measured according to the Micro-CT Test Method described herein. In this case, the first region 16 with the intermediate micro-CT basis weight value is referred to as a "knuckle" and the third region 19 with the lowest micro-CT basis weight value is also referred to as a "knuckle". The first and third regions 16, 19 combine to form a "continuous knuckle" or "substantially continuous knuckle". The second region 18 with the greatest micro-CT basis weight value is referred to as a "pillow", such as a "discrete pillow".

Alternatively, in another example (not shown), the continuous network region or substantially continuous network region may exhibit the greatest micro-CT basis weight value and be in the form of a "continuous network region" or "substantially continuous network region" referred to as a "continuous pillow" or "substantially continuous pillow" and the discrete zone or discrete zones comprise two or more regions that exhibit different micro-CT basis weight values that are less than the micro-CT basis weight value of the continuous or substantially continuous pillow and are referred to as a "discrete knuckle" with two or more knuckle regions therein or as "discrete knuckles" as measured according to the Micro-CT Test Method described herein.

The absolute difference in micro-CT basis weight values between any two or more and/or any three or more of the regions, for example the first region 16, second region 18, and third region 19 may be greater than 3 gsm and/or greater than 5 gsm and/or greater than 8 gsm and/or greater than 12 gsm and/or greater than 15 gsm and/or greater than 20 gsm and/or greater than 25 gsm and/or greater than 30 gsm and/or greater than 45 gsm as measured according to the Micro-CT Test Method described herein.

In one example, the ratio of the micro-CT basis weight values between any two of the regions, for example the micro-CT basis weight value of the of the first region 16 to the micro-CT basis weight value of the second region 18, may be less than 1 and/or less than 0.9 and/or less than 0.8 as measured according to the Micro-CT Test Method described herein.

In another example, the ratio of the micro-CT basis weight values between any two of the regions, for example the micro-CT basis weight value of the of the first region 16 to the micro-CT basis weight value of the second region 18, may be greater than 1 and/or greater than 1.05 and/or greater than 1.1 and/or greater than 1.2 and/or greater than 1.3 as measured according to the Micro-CT Test Method described herein.

The first region 16 may exhibit a micro-CT basis weight value of greater than 30 gsm and/or greater than 45 gsm and/or from about 30 gsm to about 500 gsm and/or from about 50 gsm to about 300 gsm as measured according to the Micro-CT Test Method described herein. In one example, the first region 16 exhibits a micro-CT basis weight value of from about 30 gsm to about 200 gsm and/or from about 50 gsm to about 150 gsm and/or from about 50 gsm to about 100 gsm as measured according to the Micro-CT Test Method described herein. In another example, the first region 16 exhibits a micro-CT basis weight value of from about 50 gsm to about 500 gsm and/or from about 50 gsm to about 300 gsm and/or from about 75 gsm to about 200 gsm and/or from about 75 gsm to about 150 gsm as measured according to the Micro-CT Test Method described herein.

The second region 18 may exhibit a micro-CT basis weight value of greater than 30 gsm and/or greater than 45 gsm and/or from about 30 gsm to about 500 gsm and/or from about 50 gsm to about 300 gsm as measured according to the Micro-CT Test Method described herein. In one example, the second region 18 exhibits a micro-CT basis weight value of from about 30 gsm to about 200 gsm and/or from about 50 gsm to about 150 gsm and/or from about 50 gsm to about 100 gsm as measured according to the Micro-CT Test Method described herein. In another example, the first region 16 exhibits a micro-CT basis weight value of from about 50 gsm to about 500 gsm and/or from about 50 gsm to about 300 gsm and/or from about 75 gsm to about 200 gsm and/or from about 75 gsm to about 150 gsm as measured according to the Micro-CT Test Method described herein.

The third region 19 may exhibit a micro-CT basis weight value of greater than 30 gsm and/or greater than 45 gsm and/or from about 30 gsm to about 500 gsm and/or from about 50 gsm to about 300 gsm as measured according to the Micro-CT Test Method described herein. In one example, the second region 18 exhibits a micro-CT basis weight value of from about 30 gsm to about 200 gsm and/or from about 50 gsm to about 150 gsm and/or from about 50 gsm to about 100 gsm as measured according to the Micro-CT Test Method described herein. In another example, the first region 16 exhibits a micro-CT basis weight value of from about 50 gsm to about 500 gsm and/or from about 50 gsm to about 300 gsm and/or from about 75 gsm to about 200 gsm and/or from about 75 gsm to about 150 gsm as measured according to the Micro-CT Test Method described herein.

As shown in FIGS. 3A and 3B and Table 1 below, for example, the micro-CT thickness value of the second region 18 may be greater than the micro-CT thickness value of the first region 16 and the third region 19 as measured according to the Micro-CT Test Method described herein. In this case, the first region 16 with the lowest micro-CT thickness value is referred to as a "knuckle" and the third region 19 with the intermediate micro-CT thickness value is also referred to as a "knuckle". The first and third regions 16, 19 combine to form a "continuous knuckle" or "substantially continuous knuckle". The second region 18 with the greatest micro-CT thickness value is referred to as a "pillow", such as a "discrete pillow".

Alternatively, in another example (not shown), the continuous network region or substantially continuous network region may exhibit the greatest micro-CT thickness value and may be in the form of a "continuous network region" or "substantially continuous network region" referred to as a "continuous pillow" or "substantially continuous pillow" and the discrete zone or discrete zones comprise two or more regions that exhibit different micro-CT thickness values that are less than the micro-CT thickness value of the continuous or substantially continuous pillow and are referred to as a "discrete knuckle" with two or more knuckle regions therein or as "discrete knuckles" as measured according to the Micro-CT Test Method described herein.

The absolute difference in micro-CT thickness values between any two or more and/or any three or more of the regions, for example the first region 16, second region 18, and third region 19 may be greater than 300 μm and/or greater than 500 μm and/or greater than 800 μm and/or greater than 1000 μm as measured according to the Micro-CT Test Method described herein.

In one example, the ratio of the micro-CT thickness values between any two of the regions, for example the micro-CT basis weight value of the of the first region 16 to the micro-CT thickness value of the second region 18, may be less than 1 and/or less than 0.5 and/or less than 0.2 and/or less than 0.1 and/or less than 0.09 as measured according to the Micro-CT Test Method described herein.

In another example, the ratio of the micro-CT thickness values between any two of the regions, for example the micro-CT basis weight value of the of the first region 16 to the micro-CT thickness value of the second region 18, may be greater than 1 and/or greater than 2 and/or greater than 5 and/or greater than 7 and/or greater than 10 as measured according to the Micro-CT Test Method described herein.

The first region 16 may exhibit a micro-CT thickness value of greater than 30 μm and/or greater than 50 μm and/or from about 30 μm to about 5000 μm and/or from about 50 μm to about 4000 μm and/or from about 60 μm to about 3000 μm and/or from about 60 μm to about 2200 μm as measured according to the Micro-CT Test Method described herein. In one example, the first region 16 exhibits a micro-CT thickness value of from about 30 μm to about 500 μm and/or from about 40 μm to about 300 μm and/or from about 50 μm to about 200 μm and/or from about 50 μm to about 150 μm as measured according to the Micro-CT Test Method described herein. In another example, the first region 16 exhibits a micro-CT thickness value of from about 300 μm to about 2500 μm and/or from about 500 μm to about 2000 μm and/or from about 600 μm to about 1500 μm as measured according to the Micro-CT Test Method described herein. In still another example, the first region 16 exhibits a micro-CT thickness value of from about 500 μm to about 4000 μm and/or from about 700 μm to about 3000 μm and/or from about 800 μm to about 2500 μm as measured according to the Micro-CT Test Method described herein. In even another example, the first region 16 exhibits a micro-CT thickness value of from about 1000 μm to about 5000 μm and/or from about 1500 μm to about 4000 μm and/or from about 1700 μm to about 3500 μm as measured according to the Micro-CT Test Method described herein.

The second region 18 may exhibit a micro-CT thickness value of greater than 30 μm and/or greater than 50 μm and/or from about 30 μm to about 5000 μm and/or from about 50 μm to about 4000 μm and/or from about 60 μm to about 3000 μm and/or from about 60 μm to about 2200 μm as measured according to the Micro-CT Test Method described herein. In one example, the second region 18 exhibits a micro-CT thickness value of from about 30 μm to about 500 μm and/or from about 40 μm to about 300 μm and/or from about 50 μm to about 200 μm and/or from about 50 μm to about 150 μm as measured according to the Micro-CT Test Method described herein. In another example, the second region 18 exhibits a micro-CT thickness value of from about 300 μm to about 2500 μm and/or from about 500 μm to about 2000 μm and/or from about 600 μm to about 1500 μm as measured according to the Micro-CT Test Method described herein. In still another example, the second region 18 exhibits a micro-CT thickness value of from about 500 μm to about 4000 μm and/or from about 700 μm to about 3000 μm and/or from about 800 μm to about 2500 μm as measured according to the Micro-CT Test Method described herein. In even another example, the second region 18 exhibits a micro-CT thickness value of from about 1000 μm to about 5000 μm and/or from about 1500 μm to about 4000 μm and/or from about 1700 μm to about 3500 μm as measured according to the Micro-CT Test Method described herein.

The third region 19 may exhibit a micro-CT thickness value of greater than 30 μm and/or greater than 50 μm and/or from about 30 μm to about 5000 μm and/or from about 50 μm to about 4000 μm and/or from about 60 μm to about 3000 μm and/or from about 60 μm to about 2200 μm as measured according to the Micro-CT Test Method described herein. In one example, the third region 19 exhibits a micro-CT thickness value of from about 30 μm to about 500 μm and/or from about 40 μm to about 300 μm and/or from about 50 μm to about 200 μm and/or from about 50 μm to about 150 μm as measured according to the Micro-CT Test Method described herein. In another example, the third region 19 exhibits a micro-CT thickness value of from about 300 μm to about 2500 μm and/or from about 500 μm to about 2000 μm and/or from about 600 μm to about 1500 μm as measured according to the Micro-CT Test Method described herein. In still another example, the third region 19 exhibits a micro-CT thickness value of from about 500 μm to about 4000 μm and/or from about 700 μm to about 3000 μm and/or from about 800 μm to about 2500 μm as measured according to the Micro-CT Test Method described herein. In even another example, the third region 19 exhibits a micro-CT thickness value of from about 1000 μm to about 5000 μm and/or from about 1500 μm to about 4000 μm and/or from about 1700 μm to about 3500 μm as measured according to the Micro-CT Test Method described herein.

In one example, a fibrous structure 10 according to the present invention as shown in FIGS. 3A and 3B comprises a first region 16 and a third region 19, in the form of a continuous network region or substantially continuous network region, and a second region 18, in the form of a discrete zone within the continuous network region or substantially continuous region, which may be adjacent to the first and third regions 16, 19. Each of the first, second, and third regions 16, 18, 19 have at least one common micro-CT intensive property selected from the group consisting of: micro-CT basis weight, micro-CT thickness, micro-CT density, and combinations thereof that differs in value. Table 1 below shows the respective micro-CT intensive property values for the identified micro-CT intensive properties for the first, second, and third regions 16, 18, 19 as measured according to the Micro-CT Test Method described herein.

TABLE 1

| FIG. # | Name | Micro-CT Basis Weight (gsm) | Micro-CT Thickness (μm) | Micro-CT Density (g/cm³) |
| --- | --- | --- | --- | --- |
| 3A | Third Region | 65.23 | 503.1 | 0.1296 |
| 3A | Third Region | 63.46 | 459.9 | 0.1379 |
| 3A | Second Region | 89.80 | 1446.7 | 0.0620 |
| 3A | Second Region | 84.74 | 1120.3 | 0.0756 |
| 3A | First Region | 71.82 | 69.2 | 1.0377 |
| 3A | First Region | 64.49 | 52.9 | 1.2179 |
| 3B | Third Region | 67.58 | 488.4 | 0.1383 |
| 3B | Third Region | 56.74 | 480.4 | 0.1181 |
| 3B | Second Region | 79.03 | 1033.7 | 0.0764 |

TABLE 1-continued

| FIG. # | Name | Micro-CT Basis Weight (gsm) | Micro-CT Thickness (μm) | Micro-CT Density (g/cm³) |
|---|---|---|---|---|
| 3B | Second Region | 83.18 | 1113.6 | 0.0746 |
| 3B | First Region | 73.68 | 68.1 | 1.0816 |
| 3B | First Region | 75.25 | 66.4 | 1.1323 |

Figure 3C:
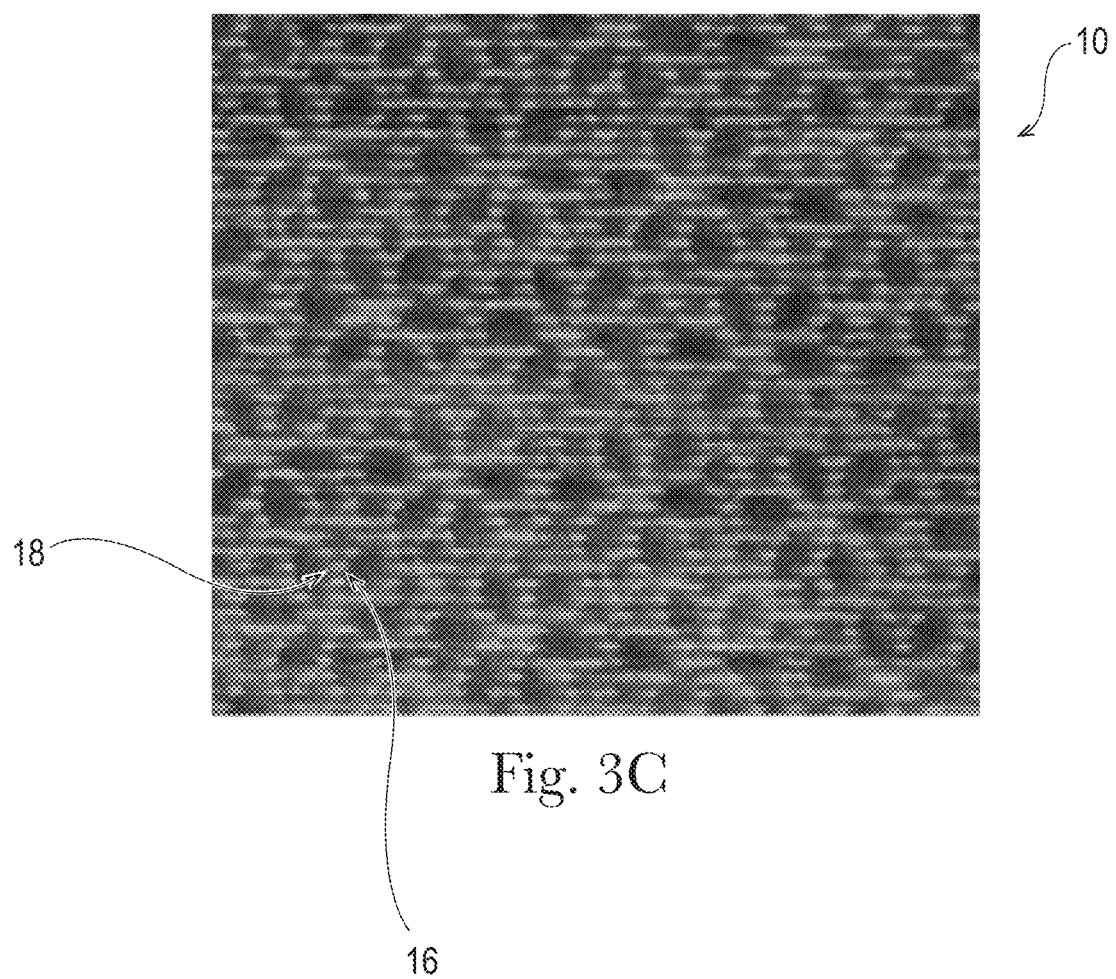
FIG. 3C is a light transmission image of the fibrous structure of FIG. 3A.

In addition to the different micro-CT intensive property values described herein, at least two of the three or more regions, for example the first region 16 and the second region 18 exhibit different light transmission values as measured according to the Light Transmission Test Method described herein and as shown in FIG. 3C. For example, the light transmission values for the first region 16 and the second region 18 of the fibrous structure 10 shown in FIG. 3C are 57.7 light transmission units and 45.5 light transmission units, respectively, as measured according to the Light Transmission Test Method.

In one example, the third region 19 exhibits a similar light transmission value as the second region 18.

In one example, the first and second regions 16, 18 exhibit an absolute difference of greater than 5 and/or greater than 7 and/or greater than 10 and/or greater than 12 light transmission units as measured according to the Light Transmission Test Method.

In another example, the ratio of the light transmission values between the first region 16 and the second region 18 may be greater than 1 and/or greater than 1.05 and/or greater than 1.1 and/or greater than 1.2 as measured according to the Light Transmission Test Method described herein.

In another example, the ratio of the light transmission values between the first region 16 and the second region 18 may be less than 1 and/or less than 0.95 and/or less than 0.90 and/or less than 0.85 and/or less than 0.80 as measured according to the Light Transmission Test Method described herein.

In one example, the first region 16 exhibits a light transmission value of less than 70 and/or less than 65 and/or less than 60 and/or less than 55 and/or less than 50 and/or less than 45 and/or greater than 10 and/or greater than 20 and/or greater than 30 light transmission units as measured according to the Light Transmission Test Method described herein.

In one example, the second region 18 exhibits a light transmission value of less than 70 and/or less than 65 and/or less than 60 and/or less than 55 and/or less than 50 and/or less than 45 and/or greater than 10 and/or greater than 20 and/or greater than 30 light transmission units as measured according to the Light Transmission Test Method described herein.

In one example, the first region 16 exhibits a light transmission value of greater than 50 to about 70 and/or greater than 50 to about 65 and/or from about 52 to about 62 and the second region 18 exhibits a light transmission value of from about 20 to less than 50 and/or from about 30 to less than 50 and/or from about 35 to about 48 light transmission units as measured according to the Light Transmission Test Method described herein.

Two Regions with Light Transmission Differences

Figure 4A:
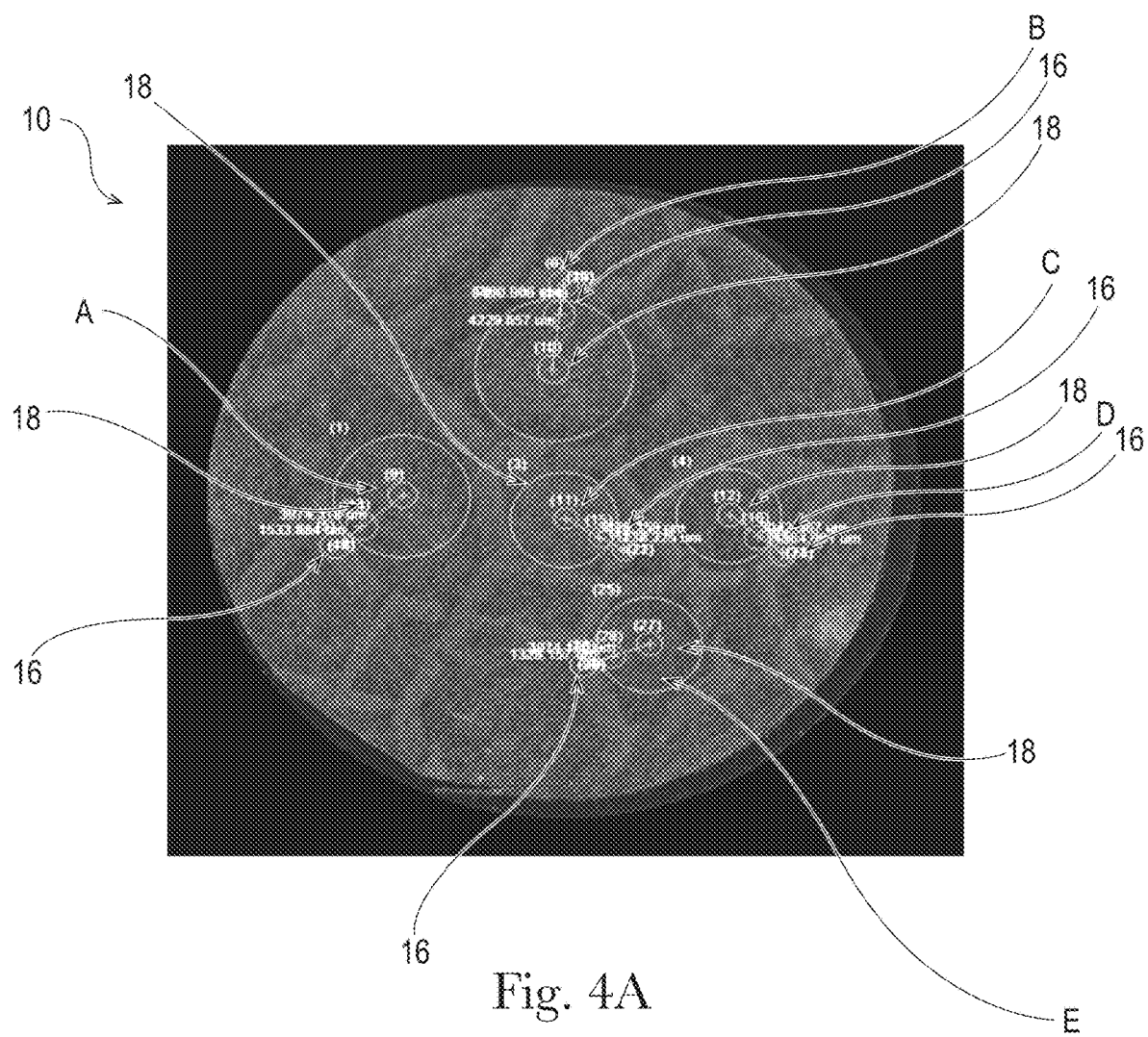
FIG. 4A is a micro-CT image of still another example of a fibrous structure according to the present invention.

In one example, a fibrous structure 10 according to the present invention as shown in FIG. 4A comprises a first region 16, in the form of a continuous network region or substantially continuous network region, and a second region 18, in the form of a discrete zone within the continuous network region or substantially continuous region, adjacent to the first region 16. The first region 16 and second region 18 have at least one common micro-CT intensive property selected from the group consisting of: micro-CT basis weight, micro-CT thickness, micro-CT density, and combinations thereof that differs in value. Table 2 below shows the respective micro-CT intensive property values for the identified micro-CT intensive properties for the first and second regions 16, 18 as measured according to the Micro-CT Test Method described herein. As shown in FIG. 4A, two areas of interest (A, B, C, D, and E) were measured according to the Micro-CT Test Method. For example, for area of interest A, a first region 16 and an adjacent second region 18 were measured according to the Micro-CT Test Method. The other areas of interest were measured in a similar manner. In addition to the actual values of the respective micro-CT intensive properties, the absolute differences between the actual respective micro-CT intensive property values were calculated and captured in Table 3 below.

Figure 4B:
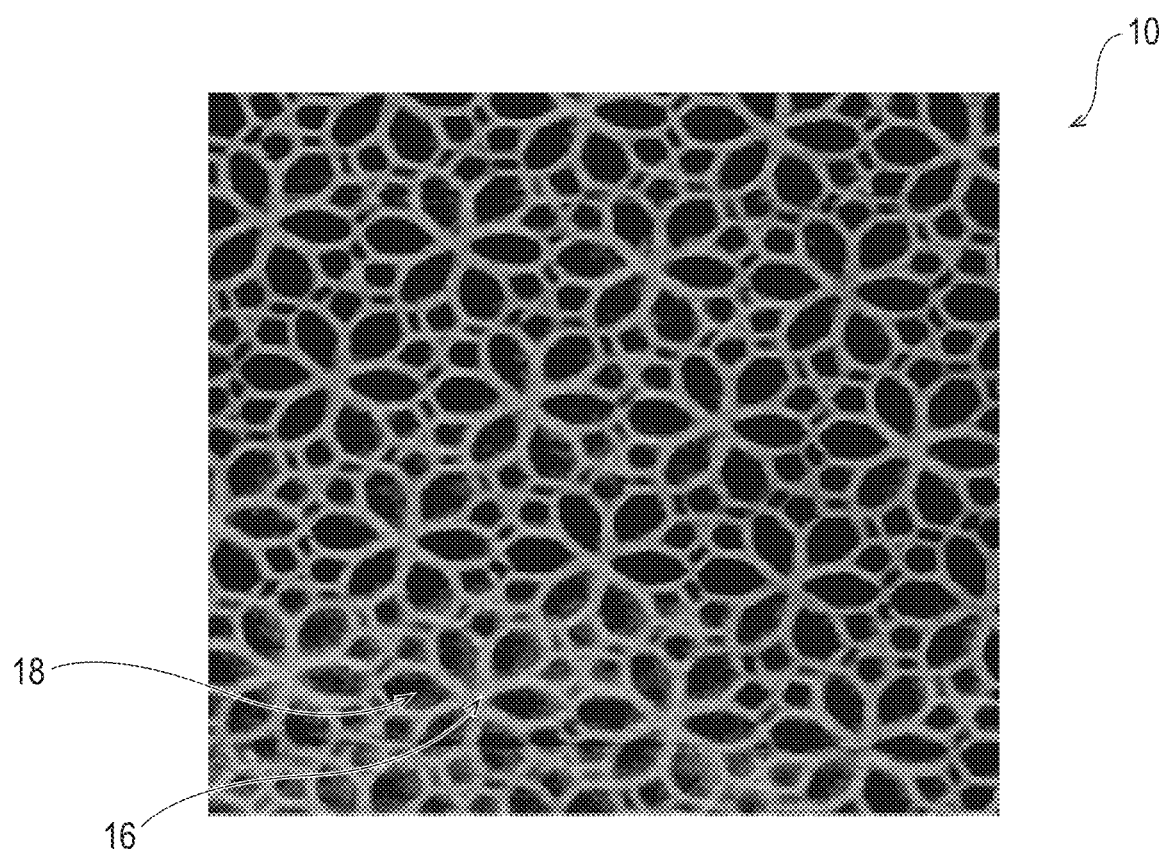
FIG. 4B is a light transmission image of the fibrous structure of FIG. 4A.

In addition, the light transmission values for the first region 16 and the second region 18 of the fibrous structure 10 shown in FIG. 4B are 54.5 light transmission units and 44.9 light transmission units, respectively, as measured according to the Light Transmission Test Method.

Figure 5:
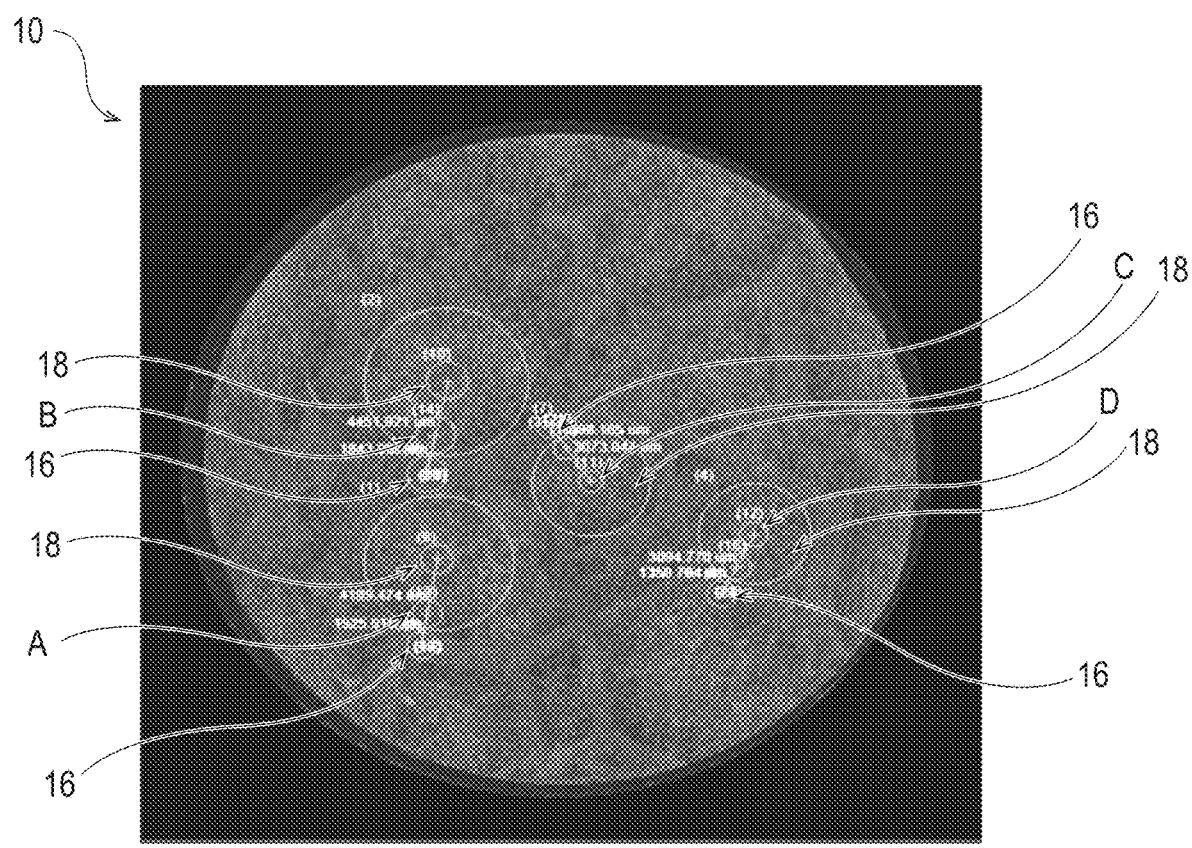
FIG. 5 is a micro-CT image of even another example of a fibrous structure according to the present invention.

In another example, a fibrous structure 10 according to the present invention as shown in FIG. 5 comprises a first region 16, in the form of a continuous network region or substantially continuous network region, and a second region 18, in the form of a discrete zone within the continuous network region or substantially continuous region, adjacent to the first region 16. The first region 16 and second region 18 have at least one common micro-CT intensive property selected from the group consisting of: micro-CT basis weight, micro-CT thickness, micro-CT density, and combinations thereof that differs in value. Table 2 below shows the respective micro-CT intensive property values for the identified micro-CT intensive properties for the first and second regions 16, 18 as measured according to the Micro-CT Test Method described herein. As shown in FIG. 5, four areas of interest (A, B, C, and D) were measured according to the Micro-CT Test Method. For example, for area of interest A, a first region 16 and an adjacent second region 18 were measured according to the Micro-CT Test Method. The other areas of interest were measured in a similar manner. In addition to the actual values of the respective micro-CT intensive properties, the absolute differences between the actual respective micro-CT intensive property values were calculated and captured in Table 3 below.

Figure 6:
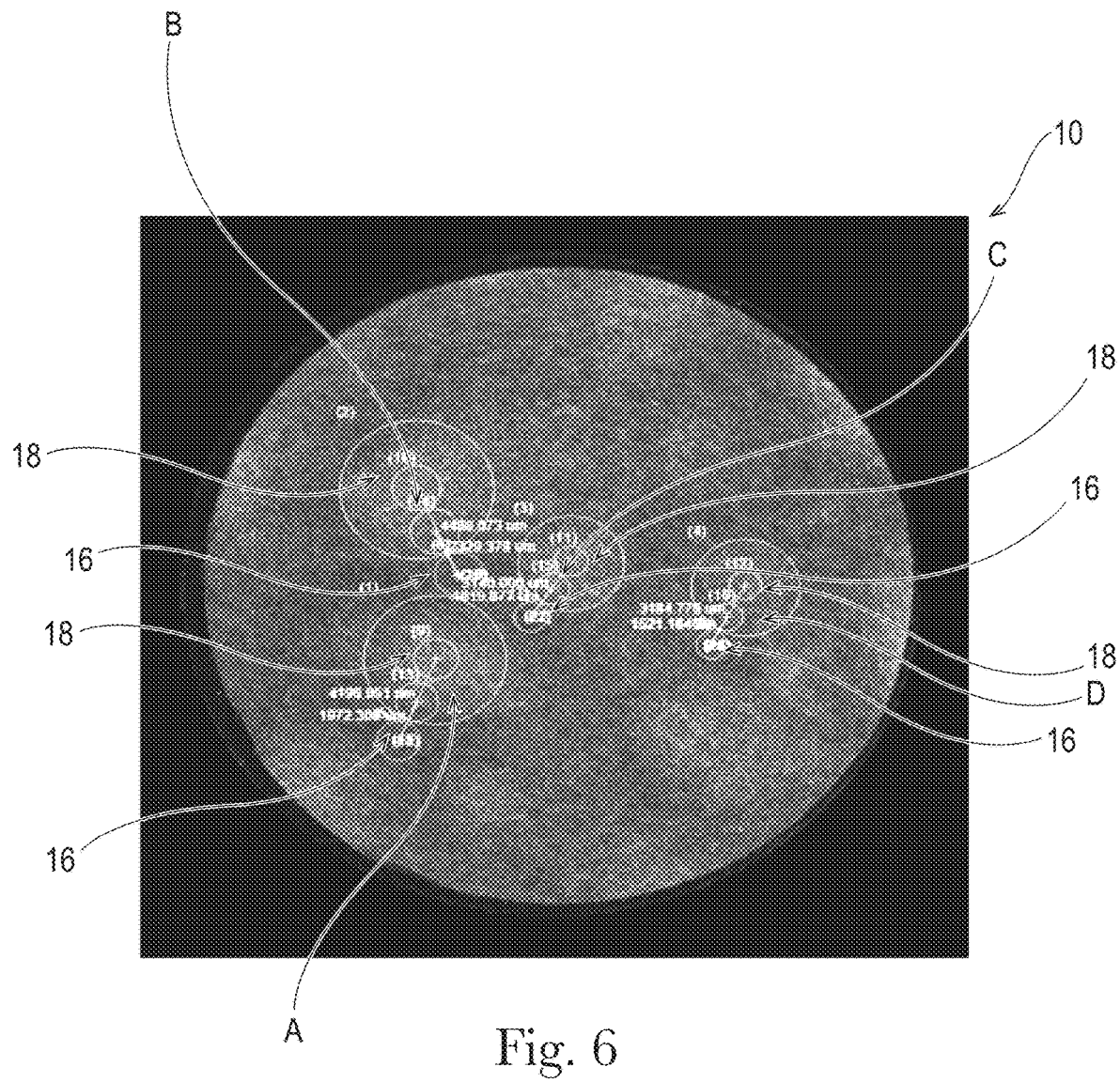
FIG. 6 is a micro-CT image of yet another example of a fibrous structure according to the present invention.

In still another example, a fibrous structure 10 according to the present invention as shown in FIG. 6 comprises a first region 16, in the form of a continuous network region or substantially continuous network region, and a second region 18, in the form of a discrete zone within the continuous network region or substantially continuous region, adjacent to the first region 16. The first region 16 and second region 18 have at least one common micro-CT intensive property selected from the group consisting of: micro-CT basis weight, micro-CT thickness, micro-CT density, and combinations thereof that differs in value. Table 2 below shows the respective micro-CT intensive property values for the identified micro-CT intensive properties for the first and second regions 16, 18 as measured according to the Micro-CT Test Method described herein. As shown in FIG. 6, four areas of interest (A, B, C, and D) were measured according to the Micro-CT Test Method. For example, for area of interest A, a first region 16 and an adjacent second region 18 were measured according to the Micro-CT Test Method. The other areas of interest were measured in a similar manner. In addition to the actual values of the respective micro-CT intensive properties, the absolute differences between the actual respective micro-CT intensive property values were calculated and captured in Table 3 below.

Figure 7:
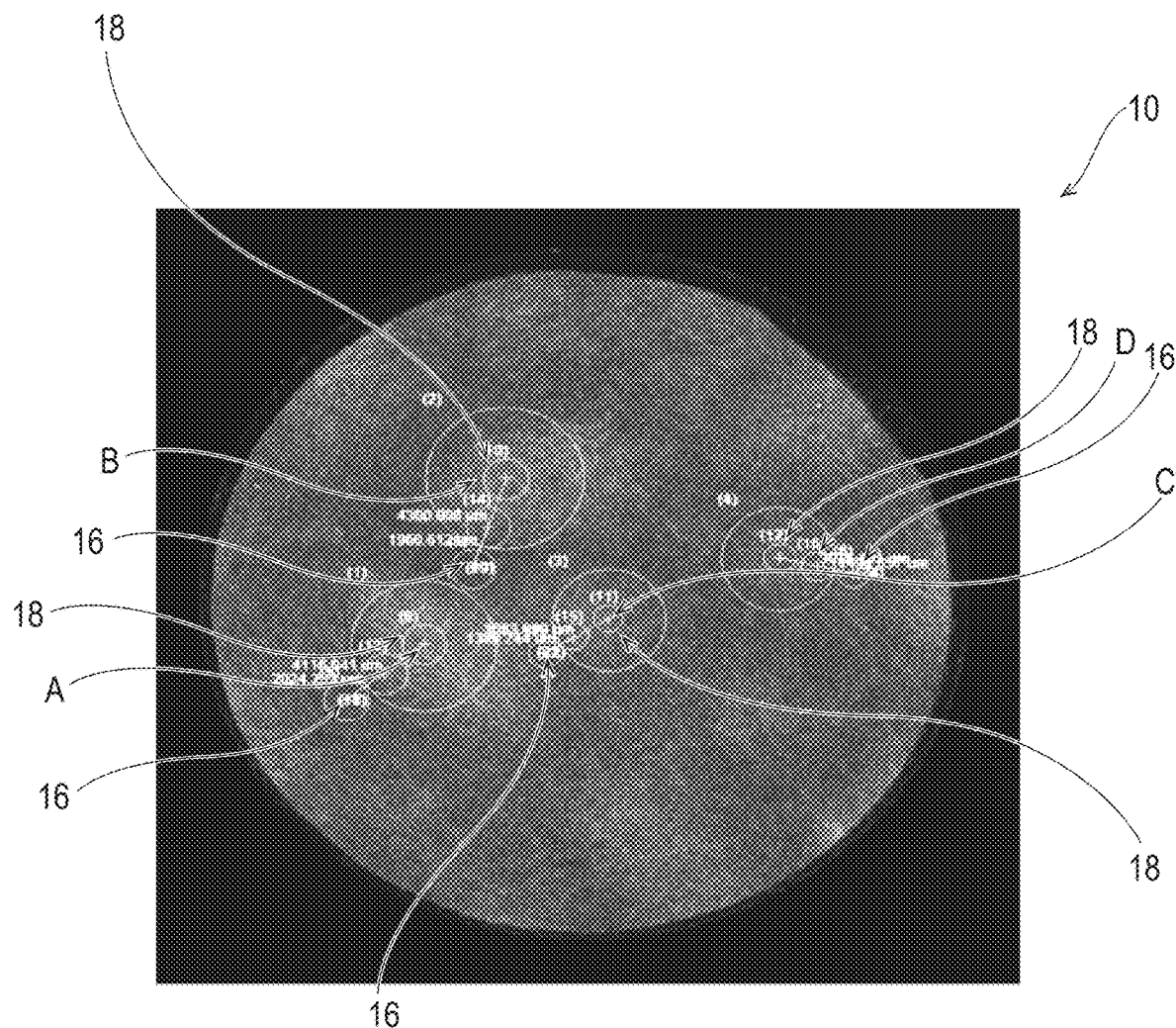
FIG. 7 is a micro-CT image of even yet another example of a fibrous structure according to the present invention.

In even another example, a fibrous structure 10 according to the present invention as shown in FIG. 7 comprises a first region 16, in the form of a continuous network region or substantially continuous network region, and a second region 18, in the form of a discrete zone within the continuous network region or substantially continuous region, adjacent to the first region 16. The first region 16 and second region 18 have at least one common micro-CT intensive property selected from the group consisting of: micro-CT basis weight, micro-CT thickness, micro-CT density, and combinations thereof that differs in value. Table 2 below shows the respective micro-CT intensive property values for the identified micro-CT intensive properties for the first and second regions 16, 18 as measured according to the Micro-CT Test Method described herein. As shown in FIG. 7, four areas of interest (A, B, C, and D) were measured according to the Micro-CT Test Method. For example, for area of interest A, a first region 16 and an adjacent second region 18 were measured according to the Micro-CT Test Method. The other areas of interest were measured in a similar manner. In addition to the actual values of the respective micro-CT intensive properties, the absolute differences between the actual respective micro-CT intensive property values were calculated and captured in Table 3 below.

In addition to the different micro-CT intensive property values described herein, at least two of the regions in the fibrous structures, for example the fibrous structures shown in FIGS. 4-7, for example the first region 16 and the second region 18 may exhibit different light transmission values as measured according to the Light Transmission Test Method described herein.

In one example, the first and second regions 16, 18 exhibit an absolute difference of greater than 5 and/or greater than 7 and/or greater than 10 and/or greater than 12 light transmission units as measured according to the Light Transmission Test Method.

In another example, the ratio of the light transmission values between the first region 16 and the second region 18 may be greater than 1 and/or greater than 1.05 and/or greater than 1.1 and/or greater than 1.2 as measured according to the Light Transmission Test Method described herein.

In another example, the ratio of the light transmission values between the first region 16 and the second region 18 may be less than 1 and/or less than 0.95 and/or less than 0.90 and/or less than 0.85 and/or less than 0.80 as measured according to the Light Transmission Test Method described herein.

In one example, the first region 16 exhibits a light transmission value of less than 70 and/or less than 65 and/or less than 60 and/or less than 55 and/or less than 50 and/or less than 45 and/or greater than 10 and/or greater than 20 and/or greater than 30 light transmission units as measured according to the Light Transmission Test Method described herein.

In one example, the second region 18 exhibits a light transmission value of less than 70 and/or less than 65 and/or less than 60 and/or less than 55 and/or less than 50 and/or less than 45 and/or greater than 10 and/or greater than 20 and/or greater than 30 light transmission units as measured according to the Light Transmission Test Method described herein.

In one example, the first region 16 exhibits a light transmission value of greater than 50 to about 70 and/or greater than 50 to about 65 and/or from about 52 to about 62 and the second region 18 exhibits a light transmission value of from about 20 to less than 50 and/or from about 30 to less than 50 and/or from about 35 to about 48 light transmission units as measured according to the Light Transmission Test Method described herein.

TABLE 2

| FIG. # | Name | Micro-CT Basis Weight (gsm) | Micro-CT Thickness (μm) | Micro-CT Density (g/cm³) |
|---|---|---|---|---|
| 4 | Second Region A | 76.38 | 944.4 | 0.0808 |
| 4 | First Region A | 67.88 | 96.4 | 0.7041 |
| 4 | Second Region B | 80.47 | 1084.0 | 0.0742 |
| 4 | First Region B | 63.56 | 87.3 | 0.7277 |
| 4 | Second Region C | 84.73 | 753.8 | 0.1124 |
| 4 | First Region C | 62.58 | 94.0 | 0.6651 |
| 4 | Second Region D | 82.20 | 687.4 | 0.1079 |
| 4 | First Region D | 74.23 | 102.0 | 0.8053 |
| 4 | Second Region E | 72.21 | 639.1 | 0.1129 |
| 4 | First Region E | 64.71 | 92.2 | 0.7014 |
| 5 | Second Region A | 83.11 | 1055.6 | 0.0787 |
| 5 | First Region A | 67.13 | 88.6 | 0.7572 |
| 5 | Second Region B | 85.77 | 1115.2 | 0.0769 |
| 5 | First Region B | 65.77 | 82.6 | 0.7959 |
| 5 | Second Region C | 75.48 | 673.9 | 0.1120 |
| 5 | First Region C | 59.00 | 76.4 | 0.7719 |
| 5 | Second Region D | 82.90 | 772.4 | 0.1073 |
| 5 | First Region D | 63.26 | 104.6 | 0.6046 |
| 6 | Second Region A | 152.61 | 2344.6 | 0.0650 |
| 6 | First Region A | 98.65 | 1168.1 | 0.0844 |
| 6 | Second Region B | 162.32 | 2386.0 | 0.0680 |
| 6 | First Region B | 108.91 | 891.2 | 0.1222 |
| 6 | Second Region C | 162.42 | 1859.8 | 0.0873 |
| 6 | First Region C | 107.39 | 953.7 | 0.1126 |
| 6 | Second Region D | 151.29 | 1963.5 | 0.0770 |
| 6 | First Region D | 116.16 | 1392.3 | 0.0834 |
| 7 | Second Region A | 191.46 | 3144.9 | 0.0608 |
| 7 | First Region A | 112.17 | 1695.8 | 0.0661 |
| 7 | Second Region B | 164.64 | 3111.6 | 0.0529 |
| 7 | First Region B | 107.92 | 2016.1 | 0.0535 |
| 7 | Second Region C | 154.25 | 2776.5 | 0.0555 |
| 7 | First Region C | 121.39 | 2148.5 | 0.0564 |
| 7 | Second Region D | 146.88 | 2477.1 | 0.0592 |
| 7 | First Region D | 131.95 | 1660.9 | 0.0794 |

TABLE 3

| FIG. # | Area of Interest | Micro-CT Basis Weight Absolute Difference (gsm) | Micro-CT Thickness Absolute Difference (μm) | Micro-CT Density Absolute Difference (g/cm³) |
|---|---|---|---|---|
| 4 | A | 8.50 | 848.0 | 0.6233 |
| 4 | B | 16.91 | 996.7 | 0.6534 |
| 4 | C | 22.14 | 659.7 | 0.5527 |
| 4 | D | 7.96 | 585.3 | 0.6973 |
| 4 | E | 7.50 | 546.8 | 0.5884 |
| 5 | A | 15.98 | 967.0 | 0.6785 |
| 5 | B | 19.99 | 1032.6 | 0.7190 |
| 5 | C | 16.47 | 597.4 | 0.6599 |
| 5 | D | 19.64 | 667.8 | 0.4973 |
| 6 | A | 53.95 | 1176.5 | 0.0193 |
| 6 | B | 53.40 | 1494.7 | 0.0541 |
| 6 | C | 55.02 | 906.0 | 0.0252 |
| 6 | D | 35.12 | 571.1 | 0.0063 |
| 7 | A | 79.29 | 1449.0 | 0.0052 |
| 7 | B | 56.72 | 1095.5 | 0.0006 |
| 7 | C | 32.86 | 628.0 | 0.0009 |
| 7 | D | 14.92 | 816.1 | 0.0201 |

Method For Making A Fibrous Structure

Figure 8A:
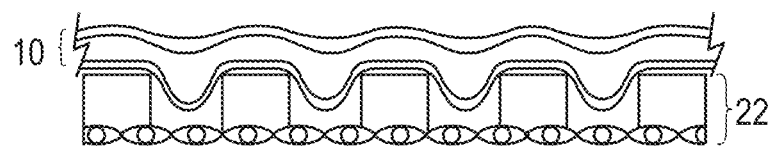
FIG. 8A is a schematic representation of a step within an example of a method for making a fibrous structure according to the present invention.
Figure 8B:
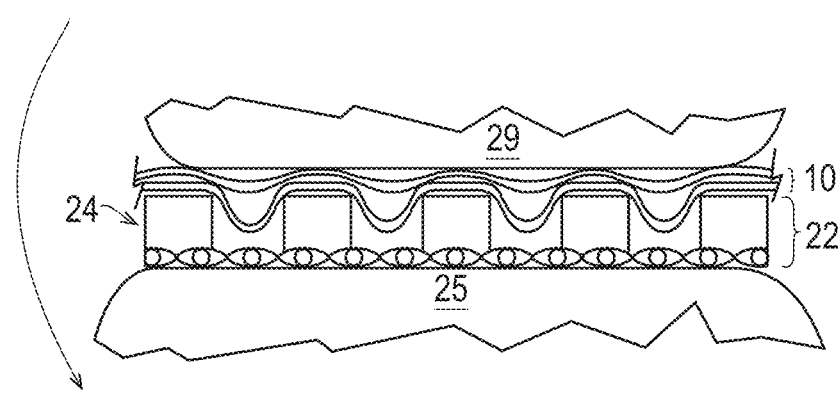
FIG. 8B is a schematic representation of another step within an example of a method for making a fibrous structure according to the present invention.
Figure 8C:
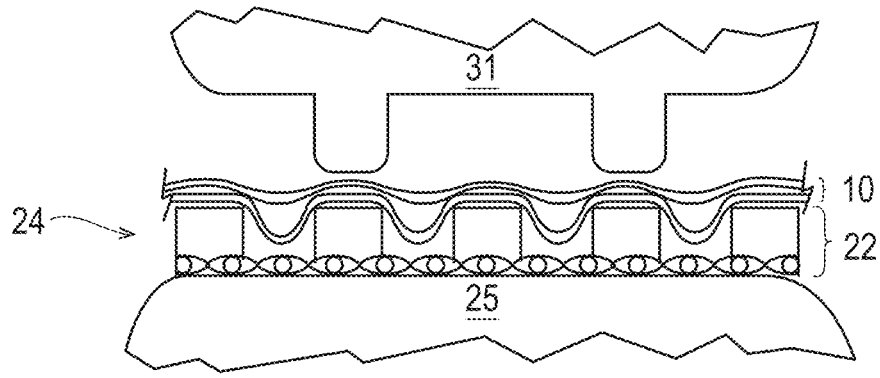
FIG. 8C is a schematic representation of another step within an example of method for making a fibrous structure according to the present invention.
Figure 9A:
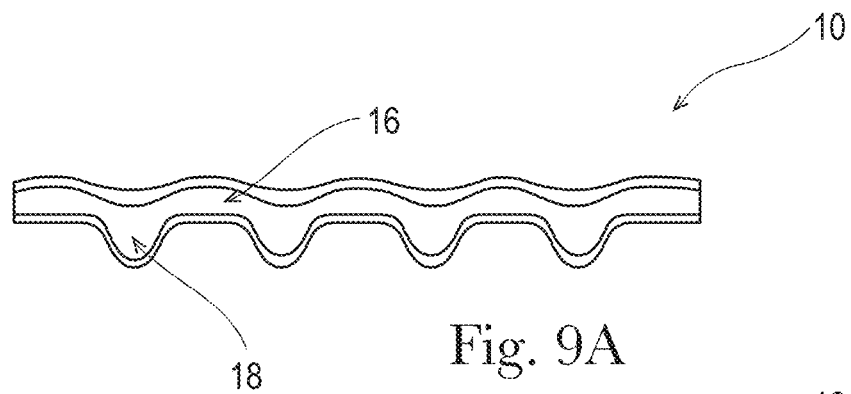
FIG. 9A is a schematic representation of an example of a fibrous structure resulting from the step of FIG. 8A.
Figure 9B:
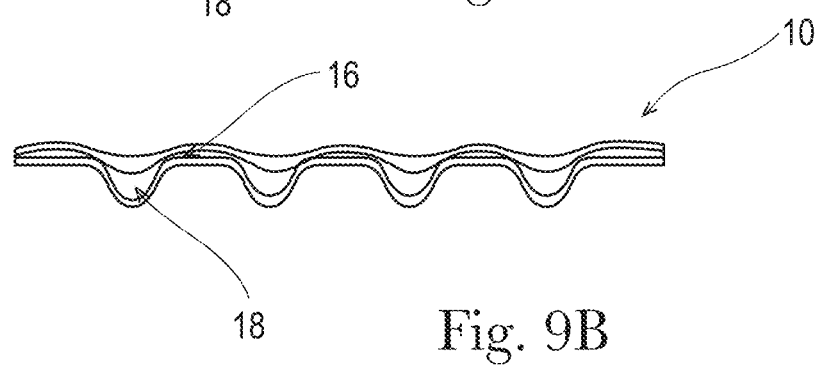
FIG. 9B is a schematic representation of an example of a fibrous structure resulting from the step of FIG. 8B.
Figure 9C:
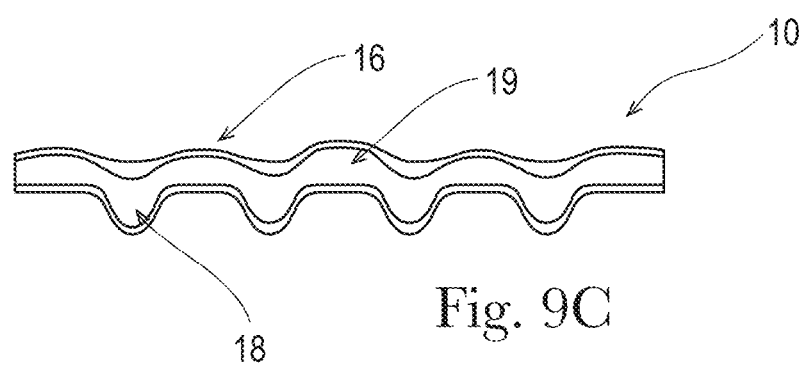
FIG. 9C is a schematic representation of an example of a fibrous structure resulting from the step of FIG. 8C.
Figure 10:
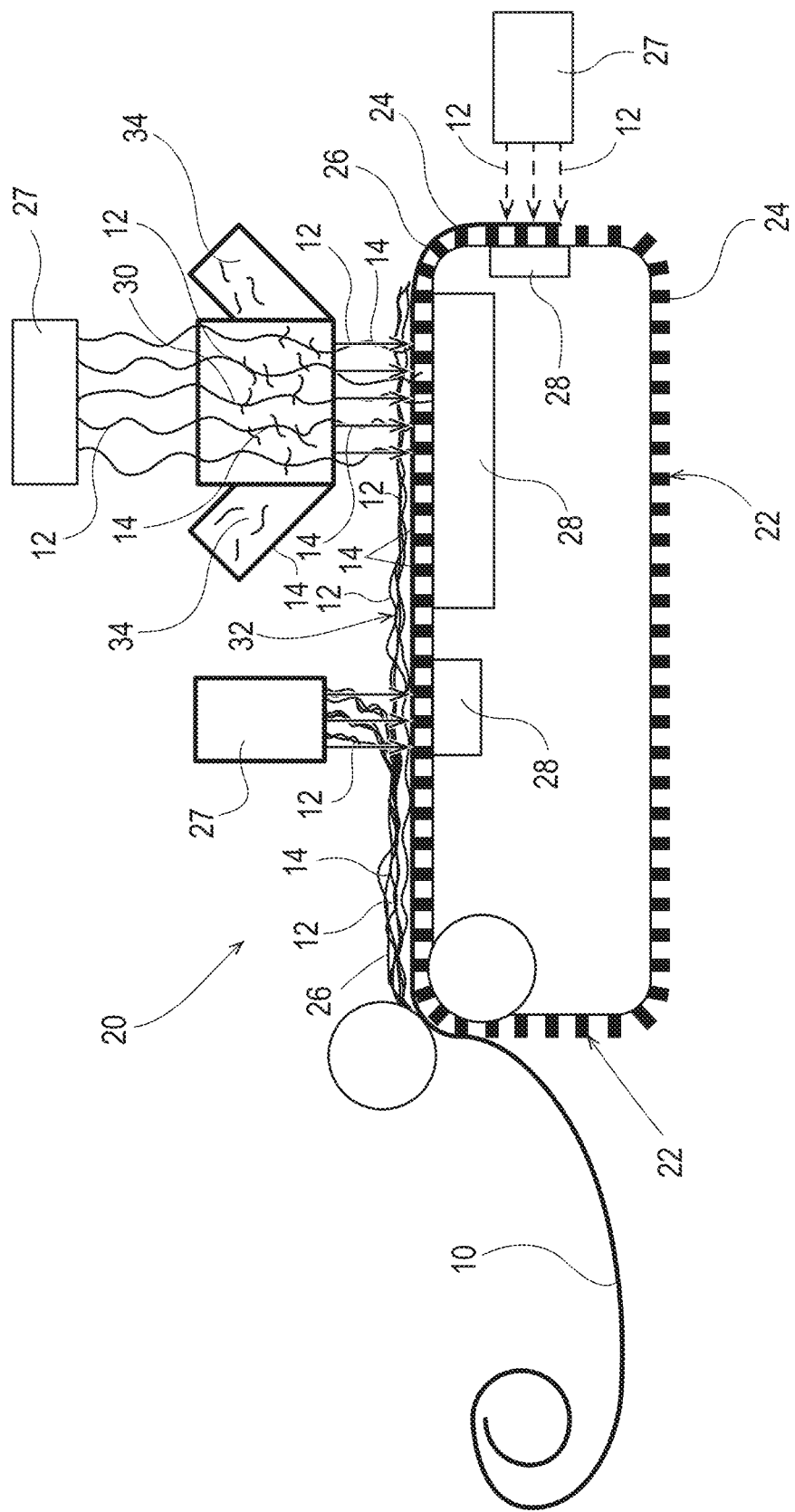
FIG. 10 is a schematic representation of an example of a method for making a fibrous structure according to the present invention.

A non-limiting example of a method for making a fibrous structure according to the present invention is represented in FIGS. 8-10. The method 20 for making a fibrous structure according to the present invention comprises the steps of: 1) as shown in FIG. 8A, collecting a mixture of filaments and solid additives, such as fibers, for example pulp fibers, onto a collection device 22, which in this case is a patterned molding member 24, that imparts a texture to at least one surface of the fibrous structure 10 (FIG. 9A) ultimately produced by the method and with the aid of a sufficient amount of vacuum applied to the collection device 22, causes rearrangement of the filaments and solid additives resulting two regions having different localized levels of filaments and solid additives. This step of collecting the filaments and solid additives on the collection device 22 comprises subjecting the fibrous structure 10 while on the collection device 22 to a consolidation step, as shown in FIGS. 8B and 8C, whereby the fibrous structure 10, while present on the collection device 22, is pressed between a nip, for example a nip formed by a flat or even surface rubber roll 25 and a flat or even surface, heated, metal roll 29 (FIG. 8B) or a nip formed by a flat or even surface rubber roll 25 and a textured or patterned heated metal roll 31 (FIG. 8C).

The method 20 shown in FIG. 10 comprises the steps of a) collecting a plurality of filaments 12 onto a collection device 22, for example a belt or fabric, such as a patterned molding member 24, to form a scrim component 26. In one example, the collection device 22, such as the patterned molding member 24 may be a straight run while the filaments 12 and solid additives 14 are being collected thereon, unlike as shown in FIG. 10. The collection of the plurality of filaments 12 onto the collection device 22 to form the scrim component 26 may be vacuum assisted by a vacuum box 28. Depending upon the level of vacuum, the filaments 12 of the scrim component 26 may conform to the collection device 22, for example a patterned molding member 24. The filaments 12 forming the scrim component 26 may be sourced from a filament source, such as a die 27, for example a meltblow die.

Once the scrim component 26 is formed on the collection device, the next step is to mix, such as commingle, a plurality of solid additives 14, such as fibers, for example pulp fibers, such as wood pulp fibers, with a plurality of filaments 12, such as in a coform box 28, and collecting the mixture on the scrim component 26 carried on the collection device 22 to form a core component 32. The collection of the mixture may be vacuum assisted by a vacuum box 28. The vacuum applied via the vacuum box 28 to the mixture may be sufficient to achieve a solid additive concentration difference (difference in average weight % of solid additives) between two or more regions of the fibrous structure 10. It is believed that the rearrangement of the fibers can take one of two modes dependent on a number of factors such as, for example, filament/fiber length. The filaments may bridge the deflection conduits spanning from one ridge to another ridges and may be merely bent into the space defined by the deflection conduit. The solid additives, for example fibers, such as pulp fibers, for example wood pulp fibers, can actually be transported from the region of the ridges of the collection device 22 and into the deflection conduits of the collection device 22.

Optionally, an additional scrim component 26 comprising filaments 12 from a filament source, such as a die 27, for example a meltblow die, may be added to the core component 32 to sandwich the core component 32 between two scrim components 26.

While not wishing to be bound by theory, the vacuum applied via the vacuum boxes 28 to the core and scrim layers may be selected to achieve common intensive properties values within two or more regions of the fibrous structure 10. It is believed that the arrangement of the filaments and solid additives as they accumulate on the collection device may take on different modes dependent on a number of factors such as, for example, filament/fiber length, size of the openings or deflection conduits in the patterned molding member, depth of the deflection conduits in the patterned molding member, filament mobility, fiber mobility, filament temperature hence its drawability, or combinations thereof. The filaments may bridge the deflection conduits spanning from one ridge to other ridges and may be merely bent into the space defined by the deflection conduit while maintaining a position on top of a ridge. The solid additives, for example fibers, such as pulp fibers, for example wood pulp fibers, may be transported or dragged by the vacuum air from the region above the ridges of the collection device 22 and into the deflection conduits of the collection device 22, while the continuous filaments will remain on the ridge or top of the deflection conduit as they lack mobility for example because of their length. Generally, the filaments and solid additives will tend to migrate with the path of the air flow as is established by the vacuum air characteristics and the air permeability of the openings in the patterned molding member. With such processes occurring across a large number of the filaments and solid additives during laydown as described herein, the intensive properties of the regions may be established.

The layered scrim component/core component 26/32 and optionally scrim component (fibrous structure 10) may then be subjected to pressure via a nip formed by two rolls and/or plates. In one example, the nip is formed by a flat or even surface rubber roll 25 and a flat or even surface, heated metal roll 29 (FIG. 8B) such that the fibrous structure 10 (FIG. 9B) is deflected into the collection device 22, for example patterned molding member 24. In another example, the nip is formed by a flat or even surface rubber roll 25 and a textured, heated metal roll 31 (FIG. 8C) such that the fibrous structure 10 (FIG. 9C) is deflected into the collection device 22, for example patterned molding member 24. The fibrous structure 10 may be imparted two or more regions that exhibit different values of at least one common micro-CT intensive property, such as micro-CT basis weight, micro-CT density, and/or micro-CT thickness, as a result of being subjected to sufficient pressure in the nip as measured according to the Micro-CT Test Method.

The collection device 22 may comprise a polymer resin arranged to impart a three-dimensional pattern to the fibrous structure 10 being formed thereon and/or to components of the fibrous structure 10, such as scrim components 26 and core components 32. The collection device 22 may be a patterned molding member 24 that results in the fibrous structure 10 exhibiting a surface pattern, such as a non-random, repeating pattern. The patterned molding member 24 may have a three-dimensional pattern on it that gets imparted to the scrim components 26 and/or the core components 32 during the process. In one example, the solid additives 14 are wood pulp fibers, such as SSK fibers and/or Eucalyptus fibers, and the filaments 12 are polypropylene filaments. The solid additives 14 may be combined with the filaments 12, such as by being delivered to a stream of filaments 12 from a hammermill (not shown) via a solid additive delivery device 34 such as a fiber spreader and/or a forming head and/or eductor. The filaments 12 may be created by meltblowing from a meltblow die, for example as shown in FIGS. 11 and 12.

Figure 11:
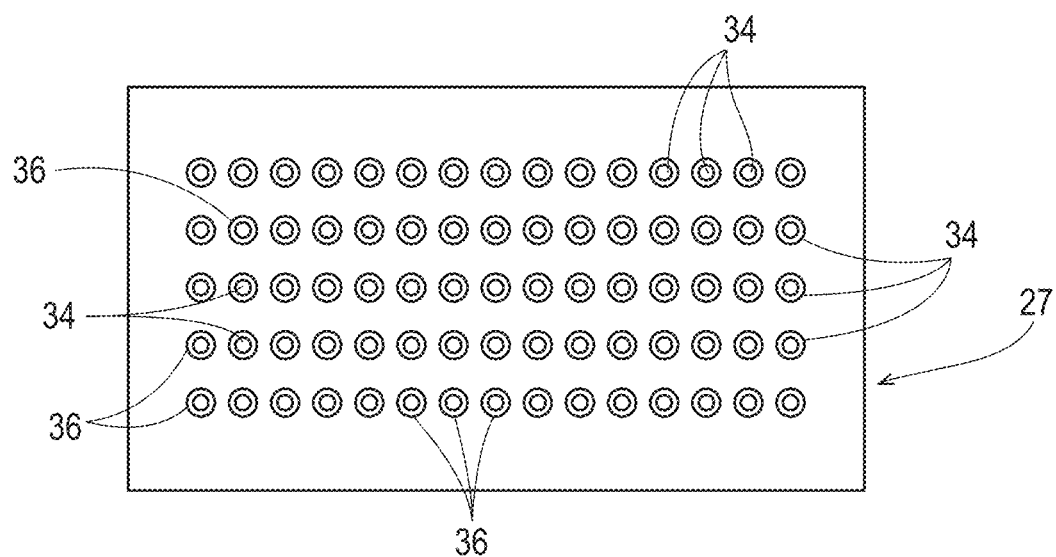
FIG. 11 is a schematic representation of a top view of a die used in the method of FIG. 10.
Figure 12:
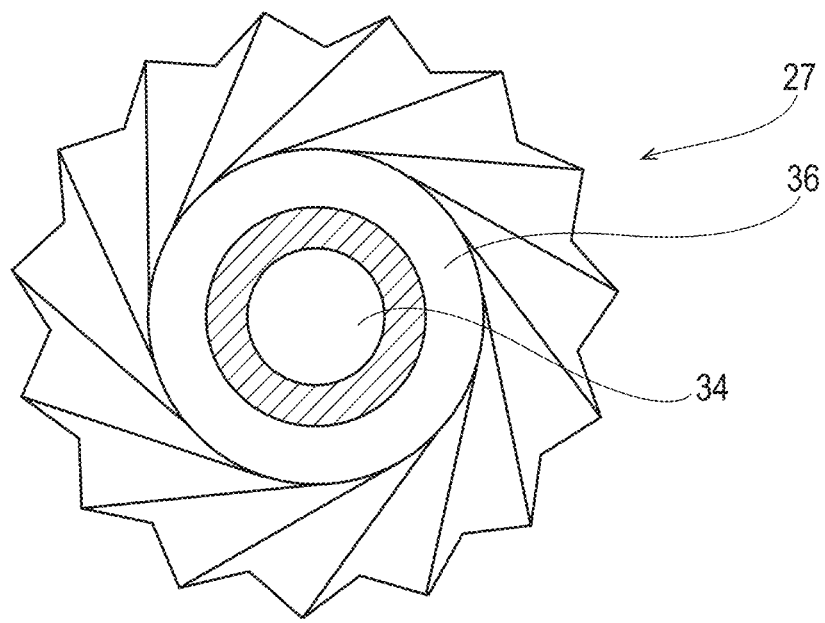
FIG. 12 is a schematic partial representation of FIG. 11.

In one example of the present invention, the core component 32 is made using a die 27, as shown in FIGS. 11 and 12, comprising at least one filament-forming hole 34, and/or 2 or more and/or 3 or more rows of filament-forming holes 34 from which filaments 12 are spun. At least one row of holes contains 2 or more and/or 3 or more and/or 10 or more filament-forming holes 34. In addition to the filament-forming holes 34, the die 27 comprises fluid releasing holes 36, such as gas-releasing holes, in one example air-releasing holes, that provide attenuation to the filaments formed from the filament-forming holes 34. One or more fluid releasing holes 46 may be associated with a filament-forming hole 34 such that the fluid exiting the fluid-releasing hole 36 is parallel or substantially parallel (rather than angled like a knife-edge die) to an exterior surface of a filament 12 exiting the filament-forming hole 34. In one example, the fluid exiting the fluid-releasing hole 36 contacts the exterior surface of a filament 12 formed from a filament-forming hole 34 at an angle of less than 30° and/or less than 20° and/or less than 10° and/or less than 5° and/or about 0°. One or more fluid-releasing holes 36 may be arranged around a filament-forming hole 34. In one example, one or more fluid-releasing holes 36 are associated with a single filament-forming hole 34 such that the fluid exiting the one or more fluid-releasing holes 36 contacts the exterior surface of a single filament 12 formed from the single filament-forming hole 34. In one example, the fluid-releasing hole 34 permits a fluid, such as a gas, for example air, to contact the exterior surface of a filament 12 formed from a filament-forming hole 34 rather than contacting an inner surface of a filament 12, such as what happens when a hollow filament is formed.

In one example, the die 27 comprises a filament-forming hole 34 positioned within a fluid-releasing hole 36. The fluid-releasing hole 36 may be concentrically or substantially concentrically positioned around a filament-forming hole 34 such as is shown in FIGS. 11 and 12.

In another example, the die 27 comprises filament-forming holes 34 and fluid-releasing holes 36 arranged to produce a plurality of filaments 12 that exhibit a broader range of filament diameters than known filament-forming hole 34 dies, such as knife-edge dies.

In still another example, the die comprises a knife-edge die.

The process of the present invention may include preparing individual rolls of fibrous structure that are suitable for consumer use. The fibrous structure may be contacted by a bonding agent (such as an adhesive and/or dry strength agent), such that the ends of a roll of sanitary tissue product according to the present invention comprise such adhesive and/or dry strength agent.

In one example, the fibrous structures are embossed and/or cut into sheets, and collected in stacks of fibrous structures.

The process of the present invention may include preparing individual rolls and/or sheets and/or stacks of sheets of fibrous structures that are suitable for consumer use.

In one example, one or more of the components of the fibrous structure may be made individually and then combined with one or more other components and/or other fibrous structures. In another example, two or more of the fibrous structures of the present invention may be combined with each other and/or with another fibrous structure to form a multi-ply fibrous structure.

The continuous polymer filament diameter distribution of all the components involved can be controlled by adjusting the attenuation process levers. These levers include, but are not limited to, the mass throughput ratio of attenuation fluid to polymer melt, the temperature of the attenuation fluid and polymer melt, spinning nozzle orifice size, polymer melt rheological properties, and polymer melt quenching. In one example, the polymer melt attenuation process can use a jet-to-melt mass ratio between 0 and 27. In another example, the polymer melt is extruded at 350° F. while the attenuation fluid was injected at 395° F. In two similar examples, polymer melt is either extruded through a 0.018" orifice diameter or a 0.015" orifice diameter at the same jet-to-melt mass ratio and temperature. In yet another example, different melt flow rate (MFR) combinations of isotactic polypropylene resins can be extruded. In still another example, cold air at 73° F. and four times more than the attenuation air by mass is injected into the forming zone and impinges the attenuation jet to drastically decrease polymer and air temperature.

Each fibrous structure can have either the same or different fiber diameter distribution as the other fibrous structures. In one example having a three-ply fibrous structure, the two plies sandwiching the center ply can have larger mean filament diameter with the same or different filament diameter distribution to provide more surface roughness. In a variation of the previous example, only one of the outer plies has a larger mean filament diameter with the same or different filament diameter distribution as the core ply, while the other outer ply has a smaller mean filament diameter with the same or different filament diameter distribution as the core ply. In another example involving a one-ply fibrous structure, the mean meltblown filament diameter is increased to provide scaffold structure for larger void space.

The process for making fibrous structure 10 may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, thermal bond, cut, stack or other post-forming operation known to those in the art. For purposes of the present invention, direct coupling means that the fibrous structure 10 can proceed directly into a converting operation rather than, for example, being convolutedly wound into a roll and then unwound to proceed through a converting operation.

Patterned Molding Members

Figure 13A:
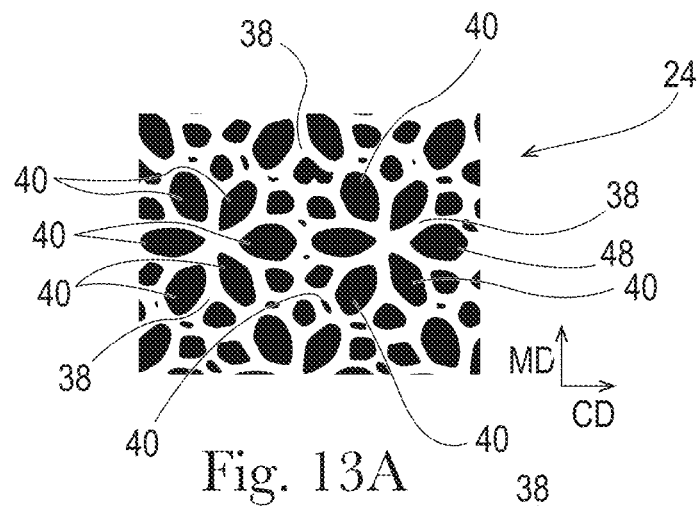
FIG. 13A is a schematic representation of an example of a patterned molding member according to the present invention.
Figure 13B:
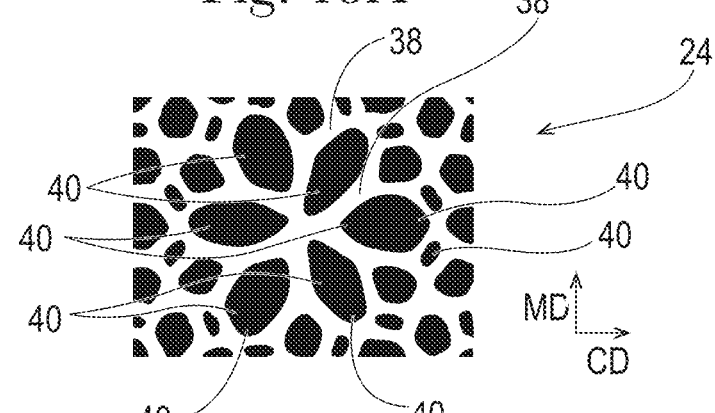
FIG. 13B is a schematic representation of another example of a patterned molding member according to the present invention.
Figure 13C:
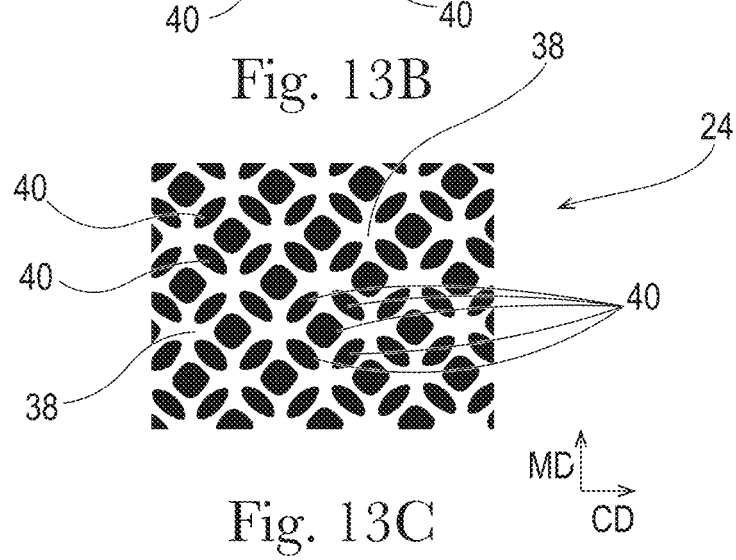
FIG. 13C is a schematic representation of another example of a patterned molding member according to the present invention.

The fibrous structures of the present invention are formed on patterned molding members 24, example of which is shown in FIGS. 13A-13C, that result in the fibrous structures of the present invention. In one example, the pattern molding member comprises a non-random repeating pattern. In another example, the pattern molding member comprises a resinous pattern.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

As shown in FIGS. 13A, 13B, and 13C, a non-limiting example of a patterned molding member 24 suitable for use in the present invention comprises a reinforcing element, such as a fabric, upon which a pattern of resin is deposited. The pattern of resin shown in FIGS. 13A, 13B, and 13C comprises a continuous network or substantially continuous network of resin 38 that impart knuckles to a fibrous structure 10 formed thereon. The continuous network or substantially continuous network of resin 38 defines deflection conduits 40 that impart pillows to a fibrous structure 10 formed thereon.

In one example, the resin on the patterned molding member 24 may exhibit widths of from about 200 µm to about 5 mm and/or from about 200 µm to about 4 mm and/or from about 200 µm to about 3 mm and/or from about 300 µm to about 2 mm and/or from about 300 µm to about 1 mm and/or from about 300 µm to about 0.5 mm. In one example, the width of the resin may vary along its length or may be constant width along its length.

In one example, the resin on the patterned molding member 24 may exhibit depths as measured from the collection side surface plane of the reinforcing element to the top of the resin pattern of greater than 0 to about 3.0 mm and/or greater than 0 to about 2.0 mm and/or greater than 0 to about 1.5 mm and/or greater than 0 to about 1.0 mm and/or greater than 0 to about 0.5 mm. In one example, the resin depths may vary within the patterned molding member or may be constant depth within the pattern molding member.

In another example, the resin on the patterned molding member 24 may exhibit depths as measured from the collection side surface plane of the reinforcing element to the top of the resin pattern of from about 0.1 mm to about 3.0 mm and/or from about 0.1 mm to about 2.0 mm and/or from about 0.5 mm to about 2.0 mm and/or from about 0.5 mm to about 1.0 mm. In one example, the resin depths may vary within the patterned molding member or may be constant depth within the pattern molding member.

In even another example, the resin on the patterned molding member 24 may exhibit depths as measured from the collection side surface plane of the reinforcing element to the top of the resin pattern of from about 0.1 mm to about 1.0 mm and/or from about 0.5 mm to about 2.0 mm and/or from about 1.0 mm to about 3.0 mm. In one example, the resin depths may vary within the patterned molding member or may be constant depth within the pattern molding member.

Products Comprising Fibrous Structures

The fibrous structures of the present invention may be used as and/or incorporated into various products, for example consumer products. Non-limiting examples of such products include wipes, for example wet wipes, such as baby wipes, adult wipes, facial cleaning wipes, and/or hard surface cleaning wipes, cleaning pads/sheets, for example floor cleaning pads, both dry and wet and those used with liquid cleaning compositions and/or water, paper towels and other dry cleaning disposable products, such as disposable dish cloths, and facial tissues.

Wipe

The fibrous structures, as described above, may be utilized to form a wipe. "Wipe" may be a general term to describe a piece of material, generally non-woven material, used in cleansing hard surfaces, food, inanimate objects, toys and body parts. In particular, many currently available wipes may be intended for the cleansing of the perianal area after defecation. Other wipes may be available for the cleansing of the face or other body parts. Multiple wipes may be attached together by any suitable method to form a mitt.

The material from which a wipe is made should be strong enough to resist tearing during normal use, yet still provide softness to the user's skin, such as a child's tender skin. Additionally, the material should be at least capable of retaining its form for the duration of the user's cleansing experience.

Wipes may be generally of sufficient dimension to allow for convenient handling. Typically, the wipe may be cut and/or folded to such dimensions as part of the manufacturing process. In some instances, the wipe may be cut into individual portions so as to provide separate wipes which are often stacked and interleaved in consumer packaging. In other embodiments, the wipes may be in a web form where the web has been slit and folded to a predetermined width and provided with means (e.g., perforations) to allow individual wipes to be separated from the web by a user. Suitably, an individual wipe may have a length between about 100 mm and about 250 mm and a width between about 140 mm and about 250 mm. In one embodiment, the wipe may be about 200 mm long and about 180 mm wide and/or about 180 mm long and about 180 mm wide and/or about 170 mm long and about 180 mm wide and/or about 160 mm long and about 175 mm wide. The material of the wipe may generally be soft and flexible, potentially having a structured surface to enhance its cleaning performance.

It is also within the scope of the present invention that the wipe may be a laminate of two or more materials. Commercially available laminates, or purposely built laminates would be within the scope of the present invention. The laminated materials may be joined or bonded together in any suitable fashion, such as, but not limited to, ultrasonic bonding, adhesive, glue, fusion bonding, heat bonding, thermal bonding and combinations thereof. In another alternative embodiment of the present invention the wipe may be a laminate comprising one or more layers of nonwoven materials and one or more layers of film. Examples of such optional films, include, but are not limited to, polyolefin films, such as, polyethylene film. An illustrative, but non-limiting example of a nonwoven material which is a laminate is a laminate of a 16 gsm nonwoven polypropylene and a 0.8 mm 20 gsm polyethylene film.

The wipes may also be treated to improve the softness and texture thereof by various treatments, such as, but not limited to, physical treatment, such as ring rolling, as described in U.S. Pat. No. 5,143,679; structural elongation, as described in U.S. Pat. No. 5,518,801; consolidation, as described in U.S. Pat. Nos. 5,914,084, 6,114,263, 6,129,801 and 6,383,431; stretch aperturing, as described in U.S. Pat. Nos. 5,628,097, 5,658,639 and 5,916,661; differential elongation, as described in WO Publication No. 2003/0028165A1; and other solid state formation technologies as described in U.S. Publication No. 2004/0131820A1 and U.S. Publication No. 2004/0265534A1 and zone activation and the like; chemical treatment, such as, but not limited to, rendering part or all of the substrate hydrophobic, and/or hydrophilic, and the like; thermal treatment, such as, but not limited to, softening of fibers by heating, thermal bonding and the like; and combinations thereof.

Wet wipes, such as baby wipes for example, should be strong enough when pre-moistened with a lotion to maintain integrity in use, but also soft enough to give a pleasing and comfortable tactile sensation to the user(s). In addition, wet wipes should have sufficient absorbency and porosity to be effective in cleaning the soiled skin of a user while at the same time providing sufficient barrier to protect the user from contacting the soil. Protecting the user from contacting the soil, creates unique "barrier" demands for fibrous structures that can negatively affect both the fibrous structures' absorbency and lotion release. Moreover, wet wipes should have absorbency properties such that each wipe of a stack remains wet during extended storage periods but yet at the same time easily releases lotion during use.

The wipe may have a basis weight of at least about 30 grams/m$^2$ and/or at least about 35 grams/m$^2$ and/or at least about 40 grams/m$^2$. In one example, the wipe may have a basis weight of at least about 45 grams/m$^2$ as measured according to the Fibrous Structure Basis Weight Test Method. In another example, the wipe basis weight may be less than about 150 grams/m$^2$. In another example, wipes may have a basis weight between about 45 grams/m$^2$ and about 75 grams/m$^2$, and in yet another embodiment a basis weight between about 45 grams/m$^2$ and about 65 grams/m$^2$ as measured according to the Fibrous Structure Basis Weight Test Method.

In another example of the present invention the wipe may be biodegradable. For example the wipe could be made from a biodegradable material such as a polyesteramide, polylactic acid, polycaprolactone, polyhydroxybutyrate, polyhydroxyalkanoates, or high wet strength cellulose.

In one example of the present invention, the fibrous structure is a pre-moistened wipe, such as a baby wipe. A plurality of the pre-moistened wipes may be stacked one on top of the other and may be contained in a container, such as a plastic tub or a film wrapper. In one example, the stack of pre-moistened wipes (typically about 40 to 80 wipes/stack) may exhibit a height of from about 50 to about 300 mm and/or from about 75 to about 125 mm The pre-moistened wipes may comprise a liquid composition, such as a lotion. The pre-moistened wipes may be stored long term in a stack in a liquid impervious container or film pouch without all of the lotion draining from the top of the stack to the bottom of the stack. The pre-moistened wipes may exhibit a Liquid Absorptive Capacity of at least 2.5 g/g and/or at least 4.0 g/g and/or at least 7 g/g and/or at least 12 g/g and/or at least 13 g/g and/or at least 13.5 g/g and/or to about 30.0 g/g and/or to about 20 g/g and/or to about 15.0 g/g as measured according to the Liquid Absorptive Capacity Test Method described herein.

In another example, the pre-moistened wipes may exhibit a saturation loading (g liquid composition to g of dry wipe) of from about 1.5 to about 6.0 g/g. The liquid composition may exhibit a surface tension of from about 20 to about 35 and/or from about 28 to about 32 dynes/cm. The pre-moistened wipes may exhibit a dynamic absorption time (DAT) from about 0.01 to about 0.4 and/or from about 0.01 to about 0.2 and/or from about 0.03 to about 0.1 seconds.

In one example, the pre-moistened wipes are present in a stack of pre-moistened wipes that exhibits a height of from about 50 to about 300 mm and/or from about 75 to about 200 mm and/or from about 75 to about 125 mm, wherein the stack of pre-moistened wipes exhibits a saturation gradient index of from about 1.0 to about 2.0 and/or from about 1.0 to about 1.7 and/or from about 1.0 to about 1.5.

The wipes may be saturation loaded with a liquid composition to form a pre-moistened fibrous structure or wipe. The loading may occur individually, or after the fibrous structures or wipes are place in a stack, such as within a liquid impervious container or packet. In one example, the pre-moistened wipes may be saturation loaded with from about 1.5 g to about 6.0 g and/or from about 2.5 g to about 4.0 g of liquid composition per g of wipe.

The wipes may be placed in the interior of a container, which may be liquid impervious, such as a plastic tub or a sealable packet, for storage and eventual sale to the consumer. The wipes may be folded and stacked. The wipes of the present invention may be folded in any of various known folding patterns, such as C-folding, Z-folding and quarter-folding. Use of a Z-fold pattern may enable a folded stack of wipes to be interleaved with overlapping portions. Alternatively, the wipes may include a continuous strip of material which has perforations between each wipe and which may be arranged in a stack or wound into a roll for dispensing, one after the other, from a container, which may be liquid impervious.

The wipes may further comprise prints, which may provide aesthetic appeal. Non-limiting examples of prints include figures, patterns, letters, pictures and combinations thereof.

Cleaning Pads/Sheets

The fibrous structures of the present invention may be used as and/or incorporated into cleaning pads and/or cleaning sheets, such as floor cleaning pads, for use alone or with an implement.

The cleaning pad or sheet may exhibit a basis weight of from about 20 gsm to about 1000 gsm and/or from about 30 gsm to about 500 gsm and/or from about 60 gsm to about 300 gsm and/or from about 75 gsm to about 200 gsm and/or from about 100 gsm to about 200 gsm.

The cleaning pad or sheet may comprise one or more additives to improve cleaning performance and/or enhance the cleaning experience. Non-limiting examples of suitable additives include waxes, such as microcrystalline wax, oils, adhesives, perfumes, and combinations thereof.

If desired, the cleaning pad or sheet may be pre-moistened. The cleaning pad or sheet may be pre-moistened with a liquid composition that provides for cleaning of the target surface, such as a floor, but yet does not require a post-cleaning rinsing operation. When pre-moistened, the cleaning pad or sheet may be loaded with at least 1, 1.5 or 2 grams of a liquid, such as a cleaning solution, per gram of dry cleaning pad or sheet, but typically not more than 5 grams per gram. The liquid, for example cleaning solution, may comprise a surfactant, such as APG surfactant which minimizes streaking since there is typically not a rinsing operation, agglomerating chemicals, disinfectants, bleaching solutions, perfumes, secondary surfactants, and combinations thereof. A suitable pre-moistened cleaning pad or sheet maybe pre-moistened according to the teachings of commonly assigned U.S. Pat. No. 6,716,805.

The cleaning pad or sheet may comprise a plurality of layers to provide for scrubbing, for example provides for more aggressive cleaning of the target surface, liquid storage, and other particularized tasks for the cleaning operation. For example, a scrubby material, such as in the form of a strip, may be added to a surface of the fibrous structure to provide a scrubby surface or portion of a surface on the cleaning pad or sheet. A non-limiting example of a suitable scrubbing material or strip may comprise a polyolefinic film, such as LDPE, and may have outwardly extending perforations. The scrubbing strip may be made and used according to commonly assigned U.S. Pat. Nos. 8,250,700; 8,407,848; D551,409 S and/or D614,408 S.

The cleaning pad or sheet according to the present invention may be used with a stick-type cleaning implement. The cleaning implement may comprise a plastic head for holding the cleaning sheet and an elongate handle articulably connected thereto. The handle may comprise a metal or plastic tube or solid rod.

The head may have a downwardly facing surface, to which the cleaning pad or sheet may be attached. The downwardly facing service may be generally flat, or slightly convex. The head may further have an upwardly facing surface. The upwardly facing surface may have a universal joint to facilitate connection of the elongate handle to the head.

A hook and loop system may be used to attach the cleaning pad or sheet directly to the bottom of the head. Alternatively, the upwardly facing surface may further comprise a mechanism, such as resilient grippers, for removably attaching the cleaning pad or sheet to the implement. Alternatively, a hook and loop system may be used to attach the cleaning pad or sheet to the head. If grippers are used with the cleaning implement, the grippers may be made according to commonly assigned U.S. Pat. Nos. 6,305,046; 6,484, 346; 6,651,290 and/or D487,173.

If desired, the cleaning implement may have an axially rotatable beater bar and/or vacuum type suction to assist in removal of debris from the target surface. Debris removed from the target surface may be collected in a dust bin. The dust bin may be mounted within the head, or, alternatively, on the elongate handle. A suitable stick-type cleaning implement may be made according to commonly assigned U.S. Pat. Des. Nos. D391,715; D409,343; D423,742; D481,184; D484,287; D484,287 and/or D588,770. A suitable vacuum type cleaning implement may be made according to the teachings of U.S. Pat. Nos. 7,137,169, D484,287 S, D615, 260 S and D615,378 S. An implement having a beater bar may be made according to commonly assigned U.S. Published Patent Application No. 2013/0333129. A motorized implement may be made according to commonly assigned U.S. Pat. No. 7,516,508.

The cleaning implement may further comprise a reservoir for storage of a cleaning solution. The reservoir may be replaced when the cleaning solution is depleted and/or refilled as desired. The reservoir may be disposed on the head or the handle of the cleaning implement. The neck of the reservoir may be offset per commonly assigned U.S. Pat. No. 6,390,335. The cleaning solution contained therein may be made according to the teachings of commonly assigned U.S. Pat. No. 6,814,088.

The cleaning implement may further comprise a pump for dispensing cleaning solution from the reservoir onto the target surface, such as a floor. The pump may be battery powered or operated by line voltage. Alternatively, the cleaning solution may be dispensed by gravity flow. The cleaning solution may be sprayed through one or more nozzles to provide for distribution of the cleaning solution onto the target surface in an efficacious pattern.

If a replaceable reservoir is utilized, the replaceable reservoir may be inverted to provide for gravity flow of the cleaning solution. Or the cleaning solution may be pumped to the dispensing nozzles. The reservoir may be a bottle, and may be made of plastic, such as a polyolefin. The cleaning implement may have a needle to receive the cleaning solution from the bottle. The bottle may have a needle piercable membrane, complementary to the needle, and which is resealed to prevent undesired dripping of the cleaning solution during insertion and removal of the replaceable reservoir. Alternatively or additionally, If desired, the implement may also provide for steam to be delivered to the cleaning pad or sheet and/or to the floor or other target surface.

A suitable reservoir and fitment therefor may be made according to commonly assigned U.S. Pat. Nos. 6,386,392, 7,172,099; D388,705; D484,804; D485, 178. A suitable cleaning implement may be made according to the teachings of commonly assigned U.S. Pat. Nos. 5,888,006; 5,960,508; 5,988,920; 6,045,622; 6,101,661; 6,142,750; 6,579,023; 6,601,261; 6,722,806; 6,766,552; D477,701 and/or D487,174. A steam implement may be made according to the teachings of jointly assigned U.S. Published Patent Application No. 2013/0319463.

The cleaning pad or sheet may comprise layers, to provide for absorption and storage of cleaning solution deposited on the target surface. If desired, the cleaning pad or sheet may comprise superabsorbent materials to increase the absorbent capacity of the cleaning pad or sheet. The superabsorbent materials may be distributed within the cleaning pad or sheet in such a manner to avoid rapid absorbency and absorb fluids slowly, to provide for the most effective use of the cleaning pad or sheet.

The cleaning pad or sheet may comprise plural layers disposed in a laminate. The lowest, or downwardly facing outer layer, may comprise apertures to allow for absorption of cleaning solution therethrough and to promote the scrubbing of the target surface. Intermediate layers may provide for storage of the liquids, and may comprise the superabsorbent materials. The cleaning pad or sheet may have an absorbent capacity of at least 10, 15, or 20 grams of cleaning solution per gram of dry cleaning pad or sheet, as set forth in commonly assigned U.S. Pat. Nos. 6,003,191 and 6,601, 261.

The top or upwardly facing outer layer of the cleaning pad or sheet (for example, the surface that contacts the cleaning implement), maybe liquid impervious in order to minimize loss of absorbed fluids. The top layer may further provide for releasable attachment of the cleaning pad or sheet to a cleaning implement. The top layer may be made of a polyolefinic film, such as LDPE.

The fibrous structures of the present invention may be cut to provide strips or portions of strips to form a cleaning article. The fibrous structure and/or strips thereof may comprise an additive to assist in removal of dust and other debris from a target surface, such as a hard surface, for example a coffee table, mantle, and the like. The additive may comprise waxes, such as microcrystalline wax, oils, adhesives and combinations thereof. The cleaning article may be made according to U.S. Pat. No. 6,813,801. The cleaning article may accept one or more complementary fork tines of a handle. The fork tines may be removably inserted into the cleaning article or sleeves formed on the cleaning article to provide for improved ergonomics. The handle may be plastic and made according to the teachings of U.S. Pat. Nos. 7,219,386; 7,293,317 and/or 7,383,602.

Non-Limiting Examples of Fibrous Structures

Example 1—Uniform Consolidation
Example—Pre-Moistened Baby Wipe

A 21%:27.5%47.5%:4% blend of Lyondell-Basell PH835 polypropylene: Lyondell-Basell Metocene MF650W polypropylene: Lyondell-Basell 650X polypropylene: Ampacet 412951 whitening agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.18 grams per hole per minute (ghm) of the melt blend is extruded from the open nozzles to form meltblown filaments from the melt blend. Approximately 426 SCFM of compressed air is heated such that the air exhibits a temperature of about 395° F. at the spinnerette. Approximately 452 g/minute of Golden Isle (from Georgia Pacific) 4825 semi-treated SSK pulp is defibrillated through a hammermill to form SSK wood pulp fibers (solid additive). Air at a temperature of about 85 to 90° F. and about 85% relative humidity (RH) is drawn into the hammermill. Approximately 3408 SCFM of air carries the pulp fibers to two solid additive spreaders. The solid additive spreaders distribute the pulp fibers in the cross-direction such that the pulp fibers are injected into the meltblown filaments at 45 degrees (with respect to the flow of the meltblown filaments) from opposite sides through a 4 inch× 15 inch cross-direction (CD) slot. The fiber carrying air also serves as cooling air for the meltblown filaments. A forming box surrounds the area where the meltblown filaments and pulp fibers are commingled. This forming box is designed to reduce the amount of air allowed to enter or escape from this commingling area. A forming vacuum pulls air through a collection device. The collection device is a patterned molding member that results in the fibrous structure exhibiting a surface pattern, a non-random, repeating pattern of regions. The patterned molding member has a three-dimensional pattern that may provide regions to be established in the fibrous structure during the process. The patterned molding member has a continuous network of polymer resin within which one or more discrete conduits are arranged. The depth of the polymer resin structure is 1.78 mm. The design of the polymer resin structure of the patterned molding member is shown in FIG. 13A.

Meltblown scrim of meltblown filaments are added to both sides of the above formed fibrous structure. The meltblown filaments for the exterior scrim layers are the same as the meltblown filaments used on the opposite scrim layer or in the center layer(s). In this particular example, one meltblown scrim layer is added to each side of the fibrous structure at approximately 0.18 grams per hole per minute (ghm). The melt blend used, 21%:27.5%47.5%:4% blend of Lyondell-Basell PH835 polypropylene: Lyondell-Basell Metocene MF650W polypropylene: Lyondell-Basell 650X polypropylene: Ampacet 412951 whitening agent, is same as the melt blend used to make the fibrous structure. Approximately 425 SCFM of compressed air is heated such that the air exhibits a temperature of about 395° F. at the spinnerette for attenuation. In this particular example, one of the two scrims is first formed on the collection device, and then the above formed fibrous structure is formed on top of the scrim on the collection device. The other scrim is then formed on the above formed fibrous structure. The forming of the scrim and core layers of the fibrous structure is further illustrated in FIG. 10.

The fibrous structure, with additional meltblown filaments on either side, formed by this process comprises about 71.5% by dry fibrous structure weight of pulp and about 28.5% by dry fibrous structure weight of meltblown filaments.

After the fibrous structure, with additional meltblown filaments (scrim layers) on either side, has been formed on the collection device, the fibrous structure is calendered at elevated temperature, while the fibrous structure is still on the collection device, a patterned molding member. In this example, the fibrous structure, with meltblown filaments on both sides, is formed on a patterned molding member as shown in FIG. 13A, and is calendared while on the patterned molding member at about 108 PLI (Average pounds per linear CD inch across the patterned molding member CD width of 21") with a flat or even surface metal anvil roll facing the fibrous structure and a flat or even surface rubber coated roll facing the patterned molding member. The metal anvil roll has an internal temperature of 275° F. as supplied by an oil heater.

After the fibrous structure is collected in roll form, it is further converted by being lotioned and cut to form a finished product.

Example 2—Patterned Consolidation—Pre-Moistened Baby Wipe

A 21%:27.5%47.5%:4% blend of Lyondell-Basell PH835 polypropylene: Lyondell-Basell Metocene MF650W polypropylene: Lyondell-Basell 650X polypropylene: Ampacet 412951 whitening agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.18 grams per hole per minute (ghm) of the melt blend is extruded from the open nozzles to form meltblown filaments from the melt blend. Approximately 425 SCFM of compressed air is heated such that the air exhibits a temperature of about 395° F. at the spinnerette. Approximately 445 g/minute of Golden Isle (from Georgia Pacific) 4825 semi-treated SSK pulp is defibrillated through a hammermill to form SSK wood pulp fibers (solid additive). Air at a temperature of about 85 to 90° F. and about 85% relative humidity (RH) is drawn into the hammermill. Approximately 3404 SCFM of air carries the pulp fibers to two solid additive spreaders. The solid additive spreaders distribute the pulp fibers in the cross-direction such that the pulp fibers are injected into the meltblown filaments at 45 degrees (with respect to the flow of the meltblown filaments) from opposite sides through a 4 inch× 15 inch cross-direction (CD) slot. The fiber carrying air also serves as cooling air for the meltblown filaments. A forming box surrounds the area where the meltblown filaments and pulp fibers are commingled. This forming box is designed to reduce the amount of air allowed to enter or escape from this commingling area. A forming vacuum pulls air through a collection device. The collection device is a patterned molding member that results in the fibrous structure exhibiting a surface pattern, a non-random, repeating pattern of regions. The patterned molding member has a three-dimensional pattern that may provide regions to be established in the fibrous structure during the process. The patterned molding member has a continuous network of polymer resin within which one or more discrete conduits are arranged. The depth of the polymer resin structure is 1.78 mm. The design of the polymer resin structure of the patterned molding member is shown in FIG. 13A.

Meltblown scrim of the meltblown filaments are added to both sides of the above formed fibrous structure. This addition of the meltblown layer can help reduce the lint created from the fibrous structure during use by consumers and is preferably performed prior to any thermal bonding operation of the fibrous structure. This addition also provide additional cleaning capabilities and serve as metering for lotion release in pre-moistened cleaning pad context. The meltblown filaments for the exterior layers are the same as the meltblown filaments used on the opposite layer or in the center layer(s). In this particular example, one meltblown layer is added to each side of the fibrous structure at approximately 0.18 grams per hole per minute (ghm). The melt blend used, 21%:27.5%47.5%:4% blend of Lyondell-Basell PH835 polypropylene: Lyondell-Basell Metocene MF650W polypropylene: Lyondell-Basell 650X polypropylene: Ampacet 412951 whitening agent, is same as the melt blend used to make the fibrous structure. Approximately 425 SCFM of compressed air is heated such that the air exhibits a temperature of about 395° F. at the spinnerette for attenuation. In this particular example, one of the two scrims is first formed on the collection device, and then the above formed fibrous structure is formed on top of the scrim on the collection device. The other scrim is then formed on the above formed fibrous structure. The forming of the scrim and core layers of the fibrous structure is further illustrated in FIG. 10.

The fibrous structure, with additional meltblown filaments on either side, formed by this process comprises about 72% by dry fibrous structure weight of pulp and about 28% by dry fibrous structure weight of meltblown filaments.

Figure 14:
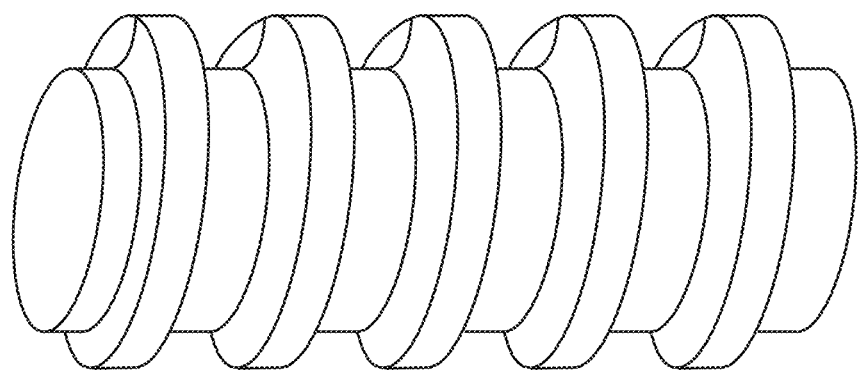
FIG. 14 is a schematic representation of a textured metal roll according to the present invention.

After the fibrous structure, with additional meltblown filaments (scrim layers) on either side, has been formed on the collection device, the fibrous structure is calendered at elevated temperature, while the fibrous structure is still on the collection device, a patterned molding member. In this example, the fibrous structure, with meltblown filaments on both sides, is formed on a patterned molding member as shown in FIG. 13A, and is calendared while on the patterned molding member at about 40 PLI (Average pounds per linear CD inch across the patterned molding member CD width of 21") with a textured metal roll facing the fibrous structure and a flat or even surface rubber coated roll facing the patterned molding member. The textured metal roll has a textured surface pattern. The textured surface pattern on the metal roll in this case comprises an alternating raised and unraised pattern of machine direction rings as shown in FIG. 14. The textured metal roll has an internal temperature of 275° F. as supplied by an oil heater.

After the fibrous structure is collected in roll form, it is further converted by being lotioned and cut to form a finished product.

Example 3—Uniform Consolidation—Non Scrubby Dish Cloth

A 20%:27.5%47.5%:5% blend of Lyondell-Basell PH835 polypropylene: Lyondell-Basell Metocene MF650W polypropylene: Lyondell-Basell 650X polypropylene: Polyvel S-1416 wetting agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.4 grams per hole per minute (ghm) of the melt blend is extruded from the open nozzles to form meltblown filaments from the melt blend. Approximately 349 SCFM of compressed air is heated such that the air exhibits a temperature of about 395° F. at the spinnerette. Approximately 1100 g/minute of Golden Isle (from Georgia Pacific) 4825 semi-treated SSK pulp is defibrillated through a hammermill to form SSK wood pulp fibers (solid additive). Air at a temperature of about 85 to 90° F. and about 85% relative humidity (RH) is drawn into the hammermill. Approximately 2791 SCFM of air carries the pulp fibers to two solid additive spreaders. The solid additive spreaders distribute the pulp fibers in the cross-direction such that the pulp fibers are injected into the meltblown filaments at 45 degrees (with respect to the flow of the meltblown filaments) from opposite sides through a 4 inch×15 inch cross-direction (CD) slot. The fiber carrying air also serves as cooling air for the meltblown filaments. A forming box surrounds the area where the meltblown filaments and pulp fibers are commingled. This forming box is designed to reduce the amount of air allowed to enter or escape from this commingling area. A forming vacuum pulls air through a collection device. The collection device is a patterned molding member that results in the fibrous structure exhibiting a surface pattern, a non-random, repeating pattern of regions. The patterned molding member has a three-dimensional pattern that may provide regions to be established in the fibrous structure during the process. The patterned molding member has a continuous network of polymer resin within which one or more discrete conduits are arranged. The depth of the polymer resin structure is 1.78 mm. The design of the polymer resin structure of the patterned molding member is shown in FIG. 13A.

Meltblown scrim of the meltblown filaments are added to both sides of the above formed fibrous structure. The meltblown filaments for the exterior layers are the same as the meltblown filaments used on the opposite layer or in the center layer(s). In this particular example, one meltblown layer is added to each side of the fibrous structure at approximately 0.18 grams per hole per minute (ghm). The melt blend used, 20%:27.5%47.5%:5% blend of Lyondell-Basell PH835 polypropylene: Lyondell-Basell Metocene MF650W polypropylene: Lyondell-Basell 650X polypropylene: Polyvel S-1416 wetting agent, is same as the melt blend used to make the fibrous structure. Approximately 425 SCFM of compressed air is heated such that the air exhibits a temperature of about 395° F. at the spinnerette for attenuation. In this particular example, one of the two scrims is first formed on the collection device, and then the above formed fibrous structure is formed on top of the scrim on the collection device. The other scrim is then formed on the above formed fibrous structure. The forming of the scrim and core layers of the fibrous structure is further illustrated in FIG. 10.

The fibrous structure, with additional meltblown filaments on either side, formed by this process comprises about 70.1% by dry fibrous structure weight of pulp and about 29.9% by dry fibrous structure weight of meltblown filaments.

After the fibrous structure, with additional meltblown filaments (scrim layers) on either side, has been formed on the collection device, the fibrous structure is calendered at elevated temperature, while the fibrous structure is still on the collection device, a patterned molding member. In this example, the fibrous structure, with meltblown filaments on both sides, is formed on a patterned molding member as shown in FIG. 13A, and is calendared while on the patterned molding member at about 162 PLI (Average pounds per linear CD inch across the patterned molding member CD width of 21") with a flat or even surface metal anvil roll facing the fibrous structure and a flat or even surface rubber coated roll facing the patterned molding member. The metal anvil roll has an internal temperature of 275° F. as supplied by an oil heater.

After the fibrous structure is collected in roll form, it is further converted by being, thermally bonded and cut to form a finished product.

Example 4—Uniform Consolidation—Scrubby Dish Cloth

A 20%:27.5%47.5%:5% blend of Lyondell-Basell PH835 polypropylene: Lyondell-Basell Metocene MF650W polypropylene: Lyondell-Basell 650X polypropylene: Polyvel S-1416 wetting agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.4 grams per hole per minute (ghm) of the melt blend is extruded from the open nozzles to form meltblown filaments from the melt blend. Approximately 349 SCFM of compressed air is heated such that the air exhibits a temperature of about 395° F. at the spinnerette. Approximately 1100 g/minute of Golden Isle (from Georgia Pacific) 4825 semi-treated SSK pulp is defibrillated through a hammermill to form SSK wood pulp fibers (solid additive). Air at a temperature of about 85 to 90° F. and about 85% relative humidity (RH) is drawn into the hammermill. Approximately 2791 SCFM of air carries the pulp fibers to two solid additive spreaders. The solid additive spreaders distribute the pulp fibers in the cross-direction such that the pulp fibers are injected into the meltblown filaments at 45 degrees (with respect to the flow of the meltblown filaments) from opposite sides through a 4 inch×15 inch cross-direction (CD) slot. The fiber carrying air also serves as cooling air for the meltblown filaments. A forming box surrounds the area where the meltblown filaments and pulp fibers are commingled. This forming box is designed to reduce the amount of air allowed to enter or escape from this commingling area. A forming vacuum pulls air through a collection device. The collection device is a patterned molding member that results in the fibrous structure exhibiting a surface pattern, a non-random, repeating pattern of regions. The patterned molding member has a three-dimensional pattern that may provide regions to be established in the fibrous structure during the process. The patterned molding member has a continuous network of polymer resin within which one or more discrete conduits are arranged. The depth of the polymer resin structure is 1.78 mm. The design of the polymer resin structure of the patterned molding member is shown in FIG. 13A.

Meltblown scrim of the meltblown filaments are added to both sides of the above formed fibrous structure. The meltblown filaments for the exterior layers are the same as the meltblown filaments used on the opposite layer or in the center layer(s). In this particular example, one meltblown layer is added to each side of the fibrous structure at approximately 0.18 grams per hole per minute (ghm). The melt blend used, 20%:27.5%47.5%:5% blend of Lyondell-Basell PH835 polypropylene: Lyondell-Basell Metocene MF650W polypropylene: Lyondell-Basell 650X polypropylene: Polyvel S-1416 wetting agent, is same as the melt blend used to make the fibrous structure. Approximately 425 SCFM of compressed air is heated such that the air exhibits a temperature of about 395° F. at the spinnerette for attenuation. In this particular example, one of the two scrims is first formed on the collection device, and then the above formed fibrous structure is formed on top of the scrim on the collection device. The other scrim is then formed on the above formed fibrous structure. The forming of the scrim and core layers of the fibrous structure is further illustrated in FIG. 10.

The fibrous structure, with additional meltblown filaments on either side, formed by this process comprises about 70.1% by dry fibrous structure weight of pulp and about 29.9% by dry fibrous structure weight of meltblown filaments.

After the fibrous structure, with additional meltblown filaments (scrim layers) on either side, has been formed on the collection device, the fibrous structure is calendered at elevated temperature, while the fibrous structure is still on the collection device, a patterned molding member. In this example, the fibrous structure, with meltblown filaments on both sides, is formed on a patterned molding member as shown in FIG. 13A, and is calendared while on the patterned molding member at about 162 PLI (Average pounds per linear CD inch across the patterned molding member CD width of 21") with a flat or even surface metal anvil roll facing the fibrous structure and a flat or even surface rubber coated roll facing the patterned molding member. The metal anvil roll has an internal temperature of 275° F. as supplied by an oil heater.

Separately, a 20%:27.5%47.5%:5% blend of Lyondell-Basell PH835 polypropylene: Lyondell-Basell Metocene MF650W polypropylene: Lyondell-Basell 650X polypropylene: Polyvel S-1416 wetting agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.207 grams per hole per minute (ghm) of the melt blend is extruded from the open nozzles to form meltblown filaments from the melt blend. Approximately 473 SCFM of compressed air is heated such that the air exhibits a temperature of about 395° F. at the spinnerette. Air at a temperature of about 85 to 90° F. and about 85% relative humidity (RH) is drawn into the hammermill. Approximately 3784 SCFM of air flows to two spreaders. Air is injected into the meltblown filament at 45 degrees (with respect to the flow of the meltblown filaments) from opposite sides through a 4 inch× 15 inch cross-direction (CD) slot. Air in the spreaders serves as cooling air for the meltblown filaments. A forming box, surrounding the area, is designed to reduce the amount of air allowed to enter or escape from this commingling area. A forming vacuum pulls air through a collection device. The meltblown filament forms a scrim on the collection device. The collection device is a Velostat 170PC 740 fabric by Albany International. For this example, the above fibrous structure is referred to as a scrubby layer.

The fabric side of a fibrous structure is the side of the fibrous structure contacting the collection device during fibrous structure forming process. The air side of a fibrous structure is the side of the fibrous structure facing air when the fibrous structure is on the collection device during fibrous structure forming process. The fabric side of a scrubby scrim is the side of the scrubby scrim contacting the collection device during scrubby scrim forming process. The air side of a scrubby scrim is the side of the scrubby scrim facing air when the scrubby scrim is on the collection device during scrubby scrim forming process. After the fibrous structure layer above and the scrubby scrim layer above are formed, the fibrous structure layer, with additional meltblown filaments on either side, and the scrubby scrim layer are laminated together. The air side of the fibrous structure layer is against fabric side of the scrubby scrim layer. After the fibrous structure layer and the scrubby scrim layer are laminated, they are thermally bonded and cut to form a finished product.

The finished product with the fibrous structure and the scrubby scrim combined together comprises about 56.1% by dry finished product weight of pulp and about 43.9% by dry finished product weight of meltblown filaments.

Example 5—Uniform Consolidation—Cleaning Pad

A 20%:27.5%47.5%:5% blend of Lyondell-Basell PH835 polypropylene: Lyondell-Basell Metocene MF650W polypropylene: Exxon-Mobil PP3546 polypropylene: Polyvel S-1416 wetting agent is dry blended, to form a melt blend. The melt blend is heated to 395° F. through a melt extruder. A 15.5 inch wide Biax 12 row spinnerette with 192 nozzles per cross-direction inch, commercially available from Biax Fiberfilm Corporation, is utilized. 24 nozzles per cross-direction inch of the 192 nozzles have a 0.018 inch inside diameter while the remaining nozzles are solid, i.e. there is no opening in the nozzle. Approximately 0.5 grams per hole per minute (ghm) of the melt blend is extruded from the open nozzles to form meltblown filaments from the melt blend. Approximately 320 SCFM of compressed air is heated such that the air exhibits a temperature of about 395° F. at the spinnerette. Approximately 640 g/minute of Golden Isle (from Georgia Pacific) 4825 semi-treated SSK pulp is defibrillated through a hammermill to form SSK wood pulp fibers (solid additive). Air at a temperature of about 85 to 90° F. and about 85% relative humidity (RH) is drawn into the hammermill. Approximately 1450 SCFM of air carries the pulp fibers to two solid additive spreaders. The solid additive spreaders distribute the pulp fibers in the cross-direction such that the pulp fibers are injected into the meltblown filaments at 45 degrees (with respect to the flow of the meltblown filaments) from opposite sides through a 4 inch× 15 inch cross-direction (CD) slot. The fiber carrying air also serves as cooling air for the meltblown filaments. A forming box surrounds the area where the meltblown filaments and pulp fibers are commingled. This forming box is designed to reduce the amount of air allowed to enter or escape from this commingling area. A forming vacuum pulls air through a collection device. The collection device is a patterned molding member that results in the fibrous structure exhibiting a surface pattern, a non-random, repeating pattern of regions. The patterned molding member has a three-dimensional pattern that may provide regions to be established in the fibrous structure during the process. The patterned molding member has a continuous network of polymer resin within which one or more discrete conduits are arranged. The depth of the polymer resin structure is 1.78 mm. The design of the polymer resin structure of the patterned molding member is shown in FIG. 13A.

Meltblown layer of the meltblown filaments, such as a scrim, can be added to one or both sides of the above formed fibrous structure. This addition of the meltblown layer can help reduce the lint created from the fibrous structure during use by consumers and is preferably performed prior to any thermal bonding operation of the fibrous structure. This addition also provides additional cleaning capabilities and serves a metering function for lotion release in a pre-moistened cleaning pad context. The meltblown filaments for the exterior layers can be the same or different than the meltblown filaments used on the opposite layer or in the center layer(s). In this particular example, one meltblown layer is added to each side of the fibrous structure at approximately 0.18 grams per hole per minute (ghm). The melt blend used, 21%:27.5%47.5%:4% blend of Lyondell-Basell PH835 polypropylene: Lyondell-Basell Metocene MF650W polypropylene: Exxon-Mobil PP3546 polypropylene: Ampacet 412951 whitening agent, is different than the melt blend used to make the fibrous structure. Approximately 425 SCFM of compressed air is heated such that the air exhibits a temperature of about 395° F. at the spinnerette for attenuation. The forming of the fibrous structure is further illustrated in FIG. 10.

After the fibrous structure, with or without additional meltblown filaments on either side, has been formed on the collection device, the fibrous structure is calendered at elevated temperature, while the fibrous structure is still on the collection device, a patterned molding member. In this example, the fibrous structure, with meltblown filaments on both sides, is formed on a patterned molding member as shown in FIG. 13A, and is calendared while on the patterned molding member at about 108 PLI (Average pounds per linear CD inch across the patterned molding member CD width of 21") with a flat or even surface metal anvil roll facing the fibrous structure and a flat or even surface rubber coated roll facing the patterned molding member. The metal anvil roll has an internal temperature of 275° F. as supplied by an oil heater.

In addition, the fibrous structure may be subjected to post-processing operations such as embossing, thermal bonding, tuft-generating operations, moisture-imparting operations, and surface treating operations to form a finished fibrous structure.

The fibrous structure formed by this process comprises about 77.6% by dry fibrous structure weight of pulp and about 22.4% by dry fibrous structure weight of meltblown filaments.

The fibrous structure may be convolutedly wound to form a roll of fibrous structure. The end edges of the roll of fibrous structure may be contacted with a material to create bond regions.

Post processed fibrous structure is then further converted to make the final cleaning pad product. Full width of the fibrous structure in this example is slit symmetrically down to 214 mm width in the CD (cross machine direction) using a set of Tidlen slitters. The slit fibrous structure is then cut in the MD (machine direction) into 260 mm rectangles as specified by the cleaning pad product specification. Each 214 mm×260 mm fibrous structure can then be symmetrically C-folded into 110 mm×260 mm folded finished product ready for lotioning.

Example 6—Uniform Consolidation—Pre-Moistened Cleaning Pad

A cleaning pad made according to Example 5 having a basis weight of about 67 g/m², which includes 8 g/m² meltblown filaments on both sides, that comprises a formed three-dimensional texture pattern is saturation loaded with a liquid composition according to the present invention to an average saturation loading of about 400% of the basis weight of the wipe. The wipes are then Z-folded and placed in a stack.

Example 7—Uniform Consolidation—Pre-Moistened Cleaning Pad

Two cleaning pads made according to Example 5 having basis weights of about 88 g/m², which includes 8 g/m² meltblown filaments on only one side, that comprise a formed three-dimensional texture pattern are combined such that the two 8 g/m² meltdown filaments are facing away from each other. The combined fibrous structure is loaded with a liquid composition according to the present invention to an average saturation loading of about 800% of the basis weight of the cleaning pad. The wipes are then C-folded and placed in a stack.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 12 hours prior to the test. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Fibrous Structure Basis Weight Test Method

Basis weight is measured prior to the application of any end-use lotion, cleaning solution, or other liquid composition, etc. to the fibrous structure or wipe, and follows a modified EDANA 40.3-90 (February 1996) method as described herein below.

1. Cut at least three test pieces of the fibrous structure or wipe to specific known dimensions using a pre-cut metal die and die press. Each test piece is cut to have an area of at least 0.01 m².

2. Use a balance to determine the mass of each test piece in grams; calculate basis weight (mass per unit area), in grams per square meter (gsm), using equation (1).

$$\text{Basis Weight} = \frac{\text{Mass of Test Piece (g)}}{\text{Area of Test Piece (m}^2\text{)}} \quad (1)$$

3. For a fibrous structure or wipe sample, report the numerical average basis weight for all test pieces.

4. If only a limited amount of the fibrous structure or wipe is available, basis weight may be measured and reported as the basis weight of one test piece, the largest rectangle possible.

5. If measuring a core layer, a scrim layer, or a combination of core and scrim layers, the respective layer is collected during the making operation without the other layers and then the basis weight of the respective layer is measured as outlined above.

Micro-CT Test Method (Micro-CT Intensive Property Measurement Test Method)

The micro-CT intensive property measurement method measures the basis weight, thickness and density values within visually discernible regions of a substrate sample. It is based on analysis of a 3D x-ray sample image obtained on a micro-CT instrument (a suitable instrument is the Scanco µCT 50 available from Scanco Medical AG, Switzerland, or equivalent). The micro-CT instrument is a cone beam microtomograph with a shielded cabinet. A maintenance free x-ray tube is used as the source with an adjustable diameter focal spot. The x-ray beam passes through the sample, where some of the x-rays are attenuated by the sample. The extent of attenuation correlates to the mass of material the x-rays have to pass through. The transmitted x-rays continue on to the digital detector array and generate a 2D projection image of the sample. A 3D image of the sample is generated by collecting several individual projection images of the sample as it is rotated, which are then reconstructed into a single 3D image. The instrument is interfaced with a computer running software to control the image acquisition and save the raw data. The 3D image is then analyzed using image analysis software (a suitable image analysis software is MATLAB available from The Mathworks, Inc., Natick, Mass., or equivalent) to measure the basis weight, thickness and density intensive properties of regions within the sample.

a. Sample Preparation:

To obtain a sample for measurement, lay a single layer of the dry substrate material out flat and die cut a circular piece with a diameter of 30 mm. If the substrate material is in the form of a wet wipe, open a new package of wet wipes and remove the entire stack from the package. Remove a single wipe from the middle of the stack, lay it out flat and allow it to dry completely prior to die cutting the sample for analysis. A sample may be cut from any location containing the region to be analyzed. A region to be analyzed is one where there are visually discernible changes in texture, elevation, or thickness. Regions within different samples taken from the same substrate material can be analyzed and compared to each other. Care should be taken to avoid folds, wrinkles or tears when selecting a location for sampling.

b. Image Acquisition:

Set up and calibrate the micro-CT instrument according to the manufacturer's specifications. Place the sample into the appropriate holder, between two rings of low density material, which have an inner diameter of 25 mm. This will allow the central portion of the sample to lay horizontal and be scanned without having any other materials directly adjacent to its upper and lower surfaces. Measurements should be taken in this region. The 3D image field of view is approximately 35 mm on each side in the xy-plane with a resolution of approximately 3500 by 3500 pixels, and with a sufficient number of 10 micron thick slices collected to fully include the z-direction of the sample. The reconstructed 3D image resolution contains isotropic voxels of 10 microns. Images are acquired with the source at 45 kVp and 200 µA with no additional low energy filter. These current and voltage settings may be optimized to produce the maximum contrast in the projection data with sufficient x-ray penetration through the sample, but once optimized held constant for all substantially similar samples. A total of 1500 projections images are obtained with an integration time of 1000 ms and 3 averages. The projection images are reconstructed into the 3D image, and saved in 16-bit RAW format to preserve the full detector output signal for analysis.

c. Image Processing:

Load the 3D image into the image analysis software. Threshold the 3D image at a value which separates, and removes, the background signal due to air, but maintains the signal from the sample fibers within the substrate.

Three 2D intensive property images are generated from the threshled 3D image. The first is the Basis Weight Image. To generate this image, the value for each voxel in an xy-plane slice is summed with all of its corresponding voxel values in the other z-direction slices containing signal from the sample. This creates a 2D image where each pixel now has a value equal to the cumulative signal through the entire sample.

In order to convert the raw data values in the Basis Weight Image into real values a basis weight calibration curve is generated. Obtain a substrate that is of substantially similar composition as the sample being analyzed and has a uniform basis weight. Follow the procedures described above to obtain at least ten replicate samples of the calibration curve substrate. Accurately measure the basis weight, by taking the mass to the nearest 0.0001 g and dividing by the sample area and converting to grams per square meter (gsm), of each of the single layer calibration samples and calculate the average to the nearest 0.01 gsm. Following the procedures described above, acquire a micro-CT image of a single layer of the calibration sample substrate. Following the procedure described above process the micro-CT image, and generate a Basis Weight Image containing raw data values. The real basis weight value for this sample is the average basis weight value measured on the calibration samples. Next, stack two layers of the calibration substrate samples on top of each other, and acquire a micro-CT image of the two layers of calibration substrate. Generate a basis weight raw data image of both layers together, whose real basis weight value is equal to twice the average basis weight value measured on the calibration samples. Repeat this procedure of stacking single layers of the calibration substrate, acquiring a micro-CT image of all of the layers, generating a raw data basis weight image of all of the layers, the real basis weight value of which is equal to the number of layers times the average basis weight value measured on the calibration samples. A total of at least four different basis weight calibration images are obtained. The basis weight values of the calibration samples must include values above and below the basis weight values of the original sample being analyzed to ensure an accurate calibration. The calibration curve is generated by performing a linear regression on the raw data versus the real basis weight values for the four calibration samples. This linear regression must have an $R^2$ value of at least 0.95, if not repeat the entire calibration procedure. This calibration curve is now used to convert the raw data values into real basis weights.

The second intensive property 2D image is the Thickness Image. To generate this image the upper and lower surfaces of the sample are identified, and the distance between these surfaces is calculated giving the sample thickness. The upper surface of the sample is identified by starting at the uppermost z-direction slice and evaluating each slice going through the sample to locate the z-direction voxel for all pixel positions in the xy-plane where sample signal was first detected. The same procedure is followed for identifying the lower surface of the sample, except the z-direction voxels located are all the positions in the xy-plane where sample signal was last detected. Once the upper and lower surfaces have been identified they are smoothed with a 15×15 median filter to remove signal from stray fibers. The 2D Thickness Image is then generated by counting the number of voxels that exist between the upper and lower surfaces for each of the pixel positions in the xy-plane. This raw thickness value is then converted to actual distance, in microns, by multiplying the voxel count by the 10 µm slice thickness resolution.

The third intensive property 2D image is the Density Image. To generate this image divide each xy-plane pixel value in the Basis Weight Image, in units of gsm, by the corresponding pixel in the Thickness Image, in units of microns. The units of the Density Image are grams per cubic centimeter (g/cc).

d. Micro-CT Basis Weight, Thickness and Density Intensive Properties:

Begin by identifying the boundary of the region to be analyzed. The boundary of a region is identified by visual discernment of differences in intensive properties when compared to other regions within the sample. For example, a region boundary can be identified based by visually discerning a thickness difference when compared to another region in the sample. Any of the intensive properties can be used to discern region boundaries on either the physical sample itself of any of the micro-CT intensive property images.

Once the boundary of the region has been identified draw the largest circular region of interest that can be inscribed within the region. From each of the three intensive property images calculate the average basis weight, thickness and density within the region of interest. Record these values as the region's micro-CT basis weight to the nearest 0.01 gsm, micro-CT thickness to the nearest 0.1 micron and micro-CT density to the nearest 0.0001 g/cc, respectively.

Light Transmission Test Method

The light transmission method measures the average amount of light transmitted through specific regions of a wet substrate sample. A calibrated light transmission image is obtained using a flatbed scanner. Image analysis software is then used to select a region of interest within the calibrated light transmission image. This enables the average light transmission value for the selected region to be measured.

a. Sample Preparation

To obtain a wet sample for measurement, open a new package of wet wipes and remove the entire stack from the package. Remove a single wipe sample from the middle of the stack. Care should be taken to select a sample without excessive folds, wrinkles or tears. If the substrate material is dry, lay a single layer of the dry substrate material out flat and die cut a square piece sample at least 6 in by 6 in (152.4 mm by 152.4 mm). Using an appropriate method for lotioning or generating a wet wipe from a dry substrate, load deionized water to the dry sample so that its weight percent of water is 300% w/w, to create a sample representative of a packaged wet wipe.

b. Light Transmission Image

The light transmission measurement is based on the CIE L*a*b* color system (CIELAB). A flatbed scanner capable of scanning a minimum of 24 bit color at 800 dpi and has manual control of color management (a suitable scanner is an Epson Perfection V750 Pro from Epson America Inc., Long Beach Calif. or equivalent) is used to acquire images. The scanner is interfaced with a computer running color management software (suitable color management software is MonacoEZColor available from X-Rite Grand Rapids, Mich. or equivalent). The scanner is calibrated against a color transparency target and corresponding reference file compliant with ANSI method IT8.7/1-1993 using the color management software to construct a calibrated color profile. The resulting calibrated scanner profile is used to color correct an image from a sample within an image analysis program that supports sampling in CIE L*a*b* (a suitable program is Photoshop CS4 available from Adobe Systems Inc., San Jose, Calif. or equivalent). All testing is performed in a conditioned room maintained at about 23±2° C. and about 50±2% relative humidity.

Turn on the scanner for 30 minutes prior to calibration. Deselect any automatic color correction or color management options that may be included in the scanner software. If the automatic color management cannot be disabled, the scanner is not appropriate for this application. Place the IT8 target face down onto the scanner glass, close the scanner lid, acquire an image at 200 dpi and 24 bit color and remove the IT8 target. Open the image file on the computer with the color management software. Follow the recommended steps within the color management software to create and export a calibrated color profile. These steps may include, ensuring that the scanned image is oriented and cropped correctly. The calibrated color profile must be compatible with the image analysis program. The color management software uses the acquired image to compare with the included reference file to create and export the calibrated color profile. After the profile is created the scan resolution (dpi)

for samples can be changed, but all other settings must be kept constant while imaging specimens.

Without undue delay following the opening of the wet wipe package, open the scanner lid and carefully place the wet sample flat on the center of the scanner glass. When placing the sample on the glass do not apply any additional pressure to avoid expressing any of the fluid out of the wipe. Acquire and import a 5 inch by 5 inch (127 mm by 127 mm) scan of the center of the sample into the image analysis software at 24 bit color and at 800 dpi in transparency mode. Transparency mode illuminates the sample from one side with the sensor capturing the image from the opposite side. Assign the calibrated color profile to the image and change the color space mode to L*a*b* Color corresponding to the CIE L*a*b* standard. This produces a color corrected image for analysis. Save this color corrected image in an uncompressed format, such as a TIFF file.

c. Analysis of Light Transmission Image

Open the color corrected light transmission image in the image analysis software. To analyze the sample light transmission image, first separate the L*, a* and b* channels, and select only the L* channel for analysis. The L* channel represents the "Lightness" or light transmission values of the image and has values that range from 0-100.

Identify the boundary of the region to be analyzed. The boundary of a region is identified by visual discernment of differences in the extent of light transmission when compared to other regions within the sample. For example, a region boundary could be identified by a region having with an average light transmission value, which is different from another region having a visually discernible different average light transmission value. Once the boundary of the region has been identified draw the largest circular region of interest that can be inscribed within the region. Calculate the average L* value or light transmission value within the region of interest. Record this value as the region's light transmission value to the nearest 0.1 units.

Diameter Test Method

The diameter of a filament, discrete or within a fibrous structure is determined by using a Scanning Electron Microscope (SEM) or an Optical Microscope and an image analysis software. A magnification of 200 to 10,000 times is chosen such that the filaments are suitably enlarged for measurement. When using the SEM, the samples are sputtered with gold or a palladium compound to avoid electric charging and vibrations of the filaments in the electron beam. A manual procedure for determining the filament diameters is used from the image (on monitor screen) taken with the SEM or the optical microscope. Using a mouse and a cursor tool, the edge of a randomly selected filament is sought and then measured across its width (i.e., perpendicular to filament direction at that point) to the other edge of the filament. A scaled and calibrated image analysis tool provides the scaling to get actual reading in µm. For filaments within a fibrous structure, several filaments are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the filament diameters, standard deviation of the filament diameters, and median of the filament diameters.

Another useful statistic is the calculation of the amount of the population of filaments that is below a certain upper limit. To determine this statistic, the software is programmed to count how many results of the filament diameters are below an upper limit and that count (divided by total number of data and multiplied by 100%) is reported in percent as percent below the upper limit, such as percent below 1 micrometer diameter or %-submicron, for example. We denote the measured diameter (in µm) of an individual circular filament as di.

In the case that the filaments have non-circular cross-sections, the measurement of the filament diameter is determined as and set equal to the hydraulic diameter which is four times the cross-sectional area of the filament divided by the perimeter of the cross-section of the filament (outer perimeter in case of hollow filaments). The number-average diameter, alternatively average diameter is calculated as:

$$d_{num} = \frac{\sum_{i=1}^{n} d_i}{n}$$

Liquid Absorptive Capacity Test Method

The following method, which is modeled after EDANA 10.4-02, is suitable to measure the Liquid Absorptive Capacity of any fibrous structure or wipe.

Prepare 5 samples of a pre-conditioned/conditioned fibrous structure or wipe for testing so that an average Liquid Absorptive Capacity of the 5 samples can be obtained.

Materials/Equipment

1. Flat stainless steel wire gauze sample holder with handle (commercially available from Humboldt Manufacturing Company) and flat stainless steel wire gauze (commercially available from McMaster-Carr) having a mesh size of 20 and having an overall size of at least 120 mm×120 mm
2. Dish of size suitable for submerging the sample holder, with sample attached, in a test liquid, described below, to a depth of approximately 20 mm
3. Binder Clips (commercially available from Staples) to hold the sample in place on the sample holder
4. Ring stand
5. Balance, which reads to four decimal places
6. Stopwatch
7. Test liquid: deionized water (resistivity>18 megaohms·cm)

Procedure

Prepare 5 samples of a fibrous structure or wipe for 5 separate Liquid Absorptive Capacity measurements. Individual test pieces are cut from the 5 samples to a size of approximately 100 mm×100 mm, and if an individual test piece weighs less than 1 gram, stack test pieces together to make sets that weigh at least 1 gram total. Fill the dish with a sufficient quantity of the test liquid described above, and allow it to equilibrate with room test conditions. Record the mass of the test piece(s) for the first measurement before fastening the test piece(s) to the wire gauze sample holder described above with the clips. While trying to avoid the creation of air bubbles, submerge the sample holder in the test liquid to a depth of approximately 20 mm and allow it to sit undisturbed for 60 seconds. After 60 seconds, remove the sample and sample holder from the test liquid. Remove all the binder clips but one, and attach the sample holder to the ring stand with the binder clip so that the sample may vertically hang freely and drain for a total of 120 seconds. After the conclusion of the draining period, gently remove the sample from the sample holder and record the sample's mass. Repeat for the remaining four test pieces or test piece sets.

Calculation of Liquid Absorptive Capacity

Liquid Absorptive Capacity is reported in units of grams of liquid composition per gram of the fibrous structure or wipe being tested. Liquid Absorptive Capacity is calculated as follows for each test that is conducted:

$$Liquid Absorptive\ Capacity = \frac{M_X - M_i}{M_i}$$

In this equation, $M_i$ is the mass in grams of the test piece(s) prior to starting the test, and $M_X$ is the mass in grams of the same after conclusion of the test procedure. Liquid Absorptive Capacity is typically reported as the numerical average of at least five tests per sample.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising a plurality of filaments and a plurality of solid additives, the fibrous structure further comprising:
   a. a first region, wherein the first region comprises two or more sub-regions, wherein at least two of the two or more sub-regions within the first region exhibit at least one common micro-CT intensive property that differs in value as measured according to the Micro-CT Test Method; and
   b. a second region.

2. The fibrous structure according to claim 1 wherein the second region is dispersed throughout the first region.

3. The fibrous structure according to claim 1 wherein the first region is a macroscopically monoplanar, patterned, first region.

4. The fibrous structure according to claim 1 wherein the filaments are present in the fibrous structure at a level of less than 90% by weight of the fibrous structure on a dry basis.

5. The fibrous structure according to claim 1 wherein the solid additives are present in the fibrous structure at a level of greater than 10% by weight of the fibrous structure on a dry basis.

6. The fibrous structure according to claim 1 wherein the filaments and solid additives are present in the fibrous structure at a weight ratio of filaments to solid additives of greater than 0 but less than 1.

7. The fibrous structure according to claim 1 wherein the filaments and solid additives are commingled together.

8. The fibrous structure according to claim 1 wherein at least one of the filaments comprises a thermoplastic polymer.

9. The fibrous structure according to claim 8 wherein the thermoplastic polymer is selected from the group consisting of: polyolefins, polyesters, polyhydroxyalkanoates, polyhydroxybutyrates, and mixtures thereof.

10. The fibrous structure according to claim 1 wherein the solid additives comprise fibers.

11. The fibrous structure according to claim 1 wherein the at least one common micro-CT intensive property is selected from the group consisting of: micro-CT basis weight, micro-CT thickness, micro-CT density, and combinations thereof as measured according to the Micro-CT Test Method.

12. The fibrous structure according to claim 1 wherein the fibrous structure is a core component.

13. The fibrous structure according to claim 12 wherein the fibrous structure further comprises a scrim component.

14. The fibrous structure according to claim 1 wherein the fibrous structure is a floor cleaning pad.

15. The fibrous structure according to claim 1 wherein the fibrous structure comprises a liquid composition.

16. The fibrous structure according to claim 15 wherein the fibrous structure is a wet wipe.

17. The fibrous structure according to claim 1 wherein the second region comprises a plurality of discrete zones dispersed throughout the first region.

18. A baby wipe comprising a fibrous structure according to claim 1.

19. A floor cleaning pad comprising a fibrous structure according to claim 1.

20. A paper towel comprising a fibrous structure according to claim 1.

* * * * *